(12) United States Patent
Bull et al.

(10) Patent No.: US 8,898,568 B2
(45) Date of Patent: Nov. 25, 2014

(54) AUDIO USER INTERFACE

(75) Inventors: William Bull, Mountian View, CA (US); Ben Rottler, San Francisco, CA (US); Jonathan A. Schiller, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 1313 days.

(21) Appl. No.: 12/207,314

(22) Filed: Sep. 9, 2008

(65) Prior Publication Data

US 2010/0064218 A1 Mar. 11, 2010

(51) Int. Cl.
*G06F 3/16* (2006.01)
*G10L 13/08* (2013.01)
*H04M 1/725* (2006.01)
*G01C 21/36* (2006.01)
*G10L 13/00* (2006.01)

(52) U.S. Cl.
CPC .................. *G06F 3/167* (2013.01); *G10L 13/08* (2013.01); *H04M 2201/39* (2013.01); *H04M 1/72594* (2013.01); *G01C 21/3629* (2013.01); *G10L 13/00* (2013.01)
USPC .............. 715/727; 715/716; 704/200; 381/61

(58) Field of Classification Search
CPC .............. G06F 3/167; H04M 1/72594; H04M 2201/39; G10L 2013/00; G10L 13/08; G01C 21/3629
USPC ........................ 715/716, 727; 704/200; 381/61
See application file for complete search history.

(56) References Cited

U.S. PATENT DOCUMENTS

| | | | |
|---|---|---|---|
| 3,704,345 | A | 11/1972 | Coker et al. |
| 3,828,132 | A | 8/1974 | Flanagan et al. |
| 3,979,557 | A | 9/1976 | Schulman et al. |
| 4,278,838 | A | 7/1981 | Antonov |
| 4,282,405 | A | 8/1981 | Taguchi |
| 4,310,721 | A | 1/1982 | Manley et al. |

(Continued)

FOREIGN PATENT DOCUMENTS

| | | |
|---|---|---|
| CH | 681572 A5 | 4/1993 |
| DE | 3837590 A1 | 5/1990 |

(Continued)

OTHER PUBLICATIONS

International Search Report and Written Opinion of Oct. 30, 2009 for PCT Patent Application No. PCT/US2009/051954, 14 pages.

(Continued)

*Primary Examiner* — Patrick Riegler
(74) *Attorney, Agent, or Firm* — Morrison & Foerster LLP

(57) ABSTRACT

An audio user interface that provides audio prompts that help a user interact with a user interface of an electronic device is disclosed. The audio prompts can provide audio indicators that allow a user to focus his or her visual attention upon other tasks such as driving an automobile, exercising, or crossing a street, yet still enable the user to interact with the user interface. An intelligent path can provide access to different types of audio prompts from a variety of different sources. The different types of audio prompts may be presented based on availability of a particular type of audio prompt. As examples, the audio prompts may include pre-recorded voice audio, such as celebrity voices or cartoon characters, obtained from a dedicate voice server. Absent availability of pre-recorded or synthesized audio data, non-voice audio prompts may be provided.

25 Claims, 12 Drawing Sheets

(56) References Cited

U.S. PATENT DOCUMENTS

| | | | |
|---|---|---|---|
| 4,348,553 A | 9/1982 | Baker et al. |
| 4,653,021 A | 3/1987 | Takagi |
| 4,677,570 A | 6/1987 | Taki |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,533,182 A | 7/1996 | Bates et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,661,787 A | 8/1997 | Pocock |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |

(56) References Cited

U.S. PATENT DOCUMENTS

| | | |
|---|---|---|
| 5,794,237 A | 8/1998 | Gore, Jr. |
| 5,799,276 A | 8/1998 | Komissarchik et al. |
| 5,802,526 A | 9/1998 | Fawcett et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,890,122 A | 3/1999 | Van Kleeck et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,912,952 A | 6/1999 | Brendzel |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,950,123 A | 9/1999 | Schwelb et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,895 A | 12/1999 | Forest |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,035,336 A | 3/2000 | Lu et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,345,250 B1 * | 2/2002 | Martin ........................ 704/260 |
| 6,356,854 B1 | 3/2002 | Schubert et al. |
| 6,356,905 B1 | 3/2002 | Gershman et al. |
| 6,360,237 B1 | 3/2002 | Schulz et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,448,485 B1 | 9/2002 | Barile |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,493,428 B1 | 12/2002 | Hillier |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,566 B1 | 2/2003 | Boyer et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,563,769 B1 | 5/2003 | Van Der Meulen |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |

(56) References Cited

U.S. PATENT DOCUMENTS

| | | |
|---|---|---|
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,720,980 B1 | 4/2004 | Lui et al. |
| 6,721,728 B2 | 4/2004 | McGreevy |
| 6,728,675 B1 | 4/2004 | Maddalozzo, Jr. et al. |
| 6,728,729 B1 | 4/2004 | Jawa et al. |
| 6,731,312 B2 | 5/2004 | Robbin |
| 6,735,632 B1 | 5/2004 | Kiraly et al. |
| 6,741,264 B1 | 5/2004 | Lesser |
| 6,742,021 B1 | 5/2004 | Halverson et al. |
| 6,754,504 B1 | 6/2004 | Reed |
| 6,757,362 B1 | 6/2004 | Cooper et al. |
| 6,757,718 B1 | 6/2004 | Halverson et al. |
| 6,760,754 B1 | 7/2004 | Isaacs et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,917,373 B2 | 7/2005 | Vong et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,978,127 B1 | 12/2005 | Bulthuis et al. |
| 6,980,949 B2 | 12/2005 | Ford |
| 6,980,955 B2 | 12/2005 | Okutani et al. |
| 6,983,251 B1 | 1/2006 | Umemoto et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,066 B2 | 2/2006 | Litwiller |
| 6,999,927 B2 | 2/2006 | Mozer et al. |
| 7,000,189 B2 | 2/2006 | Dutta et al. |
| 7,003,463 B1 | 2/2006 | Maes et al. |
| 7,010,581 B2 | 3/2006 | Brown et al. |
| 7,020,685 B1 | 3/2006 | Chen et al. |
| 7,027,974 B1 | 4/2006 | Busch et al. |
| 7,027,990 B2 | 4/2006 | Sussman |
| 7,036,128 B1 | 4/2006 | Julia et al. |
| 7,050,977 B1 | 5/2006 | Bennett |
| 7,054,888 B2 | 5/2006 | LaChapelle et al. |
| 7,058,569 B2 | 6/2006 | Coorman et al. |
| 7,058,889 B2 | 6/2006 | Trovato et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,149,319 B2 | 12/2006 | Roeck |
| 7,152,070 B1 | 12/2006 | Musick et al. |
| 7,166,791 B2 | 1/2007 | Robbin et al. |
| 7,174,295 B1 | 2/2007 | Kivimaki |
| 7,177,798 B2 | 2/2007 | Hsu et al. |
| 7,190,794 B2 | 3/2007 | Hinde |
| 7,197,460 B1 | 3/2007 | Gupta et al. |
| 7,200,559 B2 | 4/2007 | Wang |
| 7,203,646 B2 | 4/2007 | Bennett |
| 7,216,008 B2 | 5/2007 | Sakata |
| 7,216,073 B2 | 5/2007 | Lavi et al. |
| 7,216,080 B2 | 5/2007 | Tsiao et al. |
| 7,219,123 B1 | 5/2007 | Fiechter et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,246,151 B2 | 7/2007 | Isaacs et al. |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |

(56) References Cited

U.S. PATENT DOCUMENTS

| | | | |
|---|---|---|---|
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,735,012 B2 * | 6/2010 | Naik | 715/727 |
| 7,747,616 B2 | 6/2010 | Yamada et al. | |
| 7,752,152 B2 | 7/2010 | Paek et al. | |
| 7,756,868 B2 | 7/2010 | Lee | |
| 7,757,173 B2 * | 7/2010 | Beaman | 715/727 |
| 7,774,204 B2 | 8/2010 | Mozer et al. | |
| 7,779,357 B2 * | 8/2010 | Naik | 715/727 |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |
| 7,987,151 B2 | 7/2011 | Schott et al. | |
| 7,996,228 B2 | 8/2011 | Miller et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,140,335 B2 | 3/2012 | Kennewick et al. | |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,374,871 B2 | 2/2013 | Ehsani et al. | |
| 8,447,612 B2 | 5/2013 | Gazdzinski | |
| 2001/0030660 A1 | 10/2001 | Zainoulline | |
| 2001/0047264 A1 | 11/2001 | Roundtree | |
| 2002/0002039 A1 | 1/2002 | Qureshey et al. | |
| 2002/0013852 A1 | 1/2002 | Janik | |
| 2002/0032564 A1 | 3/2002 | Ehsani et al. | |
| 2002/0045438 A1 | 4/2002 | Tagawa et al. | |
| 2002/0046025 A1 | 4/2002 | Hain | |
| 2002/0046315 A1 | 4/2002 | Miller et al. | |
| 2002/0052747 A1 * | 5/2002 | Sarukkai | 704/270 |
| 2002/0069063 A1 | 6/2002 | Buchner et al. | |
| 2002/0077817 A1 | 6/2002 | Atal | |
| 2002/0080163 A1 | 6/2002 | Morey | |
| 2002/0103641 A1 | 8/2002 | Kuo et al. | |
| 2002/0143533 A1 | 10/2002 | Lucas et al. | |
| 2002/0143551 A1 * | 10/2002 | Sharma et al. | 704/270.1 |
| 2002/0164000 A1 | 11/2002 | Cohen et al. | |
| 2002/0169605 A1 * | 11/2002 | Damiba et al. | 704/235 |
| 2002/0198714 A1 | 12/2002 | Zhou | |
| 2003/0001881 A1 | 1/2003 | Mannheimer et al. | |
| 2003/0020760 A1 | 1/2003 | Takatsu et al. | |
| 2003/0074198 A1 | 4/2003 | Sussman | |
| 2003/0079038 A1 | 4/2003 | Robbin et al. | |
| 2003/0098892 A1 | 5/2003 | Hiipakka | |
| 2003/0144846 A1 * | 7/2003 | Denenberg et al. | 704/277 |
| 2003/0158737 A1 | 8/2003 | Csicsatka | |
| 2003/0167318 A1 | 9/2003 | Robbin et al. | |
| 2003/0167335 A1 * | 9/2003 | Alexander | 709/228 |
| 2003/0188005 A1 * | 10/2003 | Yoneda et al. | 709/231 |
| 2003/0197744 A1 | 10/2003 | Irvine | |
| 2004/0051729 A1 | 3/2004 | Borden, IV | |
| 2004/0052338 A1 * | 3/2004 | Celi et al. | 379/88.16 |
| 2004/0055446 A1 | 3/2004 | Robbin et al. | |
| 2004/0061717 A1 | 4/2004 | Menon et al. | |
| 2004/0114731 A1 | 6/2004 | Gillett et al. | |
| 2004/0127241 A1 | 7/2004 | Shostak | |
| 2004/0135701 A1 | 7/2004 | Yasuda et al. | |
| 2004/0218451 A1 | 11/2004 | Said et al. | |
| 2004/0225746 A1 | 11/2004 | Niell et al. | |
| 2004/0236778 A1 | 11/2004 | Junqua et al. | |
| 2005/0015254 A1 | 1/2005 | Beaman | |
| 2005/0034164 A1 * | 2/2005 | Sano et al. | 725/91 |
| 2005/0045373 A1 | 3/2005 | Born | |
| 2005/0055403 A1 | 3/2005 | Brittan | |
| 2005/0071332 A1 | 3/2005 | Ortega et al. | |
| 2005/0080625 A1 | 4/2005 | Bennett et al. | |
| 2005/0091118 A1 | 4/2005 | Fano | |
| 2005/0102614 A1 | 5/2005 | Brockett et al. | |
| 2005/0102625 A1 | 5/2005 | Lee et al. | |
| 2005/0108001 A1 | 5/2005 | Aarskog | |
| 2005/0108338 A1 | 5/2005 | Simske et al. | |
| 2005/0114124 A1 | 5/2005 | Liu et al. | |
| 2005/0119897 A1 | 6/2005 | Bennett et al. | |
| 2005/0143972 A1 | 6/2005 | Gopalakrishnan et al. | |
| 2005/0165607 A1 | 7/2005 | DiFabbrizio et al. | |
| 2005/0182629 A1 | 8/2005 | Coorman et al. | |
| 2005/0196733 A1 | 9/2005 | Budra et al. | |
| 2005/0203991 A1 * | 9/2005 | Kawamura et al. | 709/203 |
| 2005/0288936 A1 | 12/2005 | Busayapongchai et al. | |
| 2006/0018492 A1 | 1/2006 | Chiu et al. | |
| 2006/0095846 A1 | 5/2006 | Nurmi | |
| 2006/0095848 A1 * | 5/2006 | Naik | 715/716 |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0122836 A1 | 6/2006 | Cross, Jr. et al. | |
| 2006/0143007 A1 | 6/2006 | Koh et al. | |

(56) References Cited

U.S. PATENT DOCUMENTS

| | | | |
|---|---|---|---|
| 2006/0183466 A1* | 8/2006 | Lee et al. | 455/414.1 |
| 2006/0277058 A1 | 12/2006 | J'maev et al. | |
| 2007/0043568 A1* | 2/2007 | Dhanakshirur et al. | 704/258 |
| 2007/0044038 A1 | 2/2007 | Horentrup et al. | |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0135949 A1 | 6/2007 | Snover et al. | |
| 2007/0174188 A1 | 7/2007 | Fish | |
| 2007/0180383 A1 | 8/2007 | Naik | |
| 2007/0185917 A1 | 8/2007 | Prahlad et al. | |
| 2007/0271104 A1* | 11/2007 | McKay | 704/270.1 |
| 2007/0282595 A1 | 12/2007 | Tunning et al. | |
| 2008/0015864 A1 | 1/2008 | Ross et al. | |
| 2008/0021708 A1 | 1/2008 | Bennett et al. | |
| 2008/0031475 A1* | 2/2008 | Goldstein | 381/151 |
| 2008/0034032 A1 | 2/2008 | Healey et al. | |
| 2008/0042970 A1* | 2/2008 | Liang et al. | 345/156 |
| 2008/0052063 A1 | 2/2008 | Bennett et al. | |
| 2008/0120112 A1 | 5/2008 | Jordan et al. | |
| 2008/0129520 A1 | 6/2008 | Lee | |
| 2008/0133215 A1* | 6/2008 | Sarukkai | 704/2 |
| 2008/0140657 A1 | 6/2008 | Azvine et al. | |
| 2008/0147874 A1* | 6/2008 | Yoneda et al. | 709/231 |
| 2008/0208587 A1 | 8/2008 | Ben-David et al. | |
| 2008/0221903 A1 | 9/2008 | Kanevsky et al. | |
| 2008/0228496 A1 | 9/2008 | Yu et al. | |
| 2008/0247519 A1 | 10/2008 | Abella et al. | |
| 2008/0249770 A1 | 10/2008 | Kim et al. | |
| 2008/0300878 A1 | 12/2008 | Bennett | |
| 2008/0319763 A1 | 12/2008 | Di Fabbrizio et al. | |
| 2009/0006100 A1 | 1/2009 | Badger et al. | |
| 2009/0006343 A1 | 1/2009 | Platt et al. | |
| 2009/0011709 A1* | 1/2009 | Akasaka et al. | 455/41.3 |
| 2009/0030800 A1 | 1/2009 | Grois | |
| 2009/0055179 A1 | 2/2009 | Cho et al. | |
| 2009/0058823 A1 | 3/2009 | Kocienda | |
| 2009/0076796 A1 | 3/2009 | Daraselia | |
| 2009/0077165 A1 | 3/2009 | Rhodes et al. | |
| 2009/0092260 A1* | 4/2009 | Powers | 381/57 |
| 2009/0100049 A1 | 4/2009 | Cao | |
| 2009/0112677 A1 | 4/2009 | Rhett | |
| 2009/0150156 A1 | 6/2009 | Kennewick et al. | |
| 2009/0157401 A1 | 6/2009 | Bennett | |
| 2009/0164441 A1 | 6/2009 | Cheyer | |
| 2009/0171664 A1 | 7/2009 | Kennewick et al. | |
| 2009/0248182 A1* | 10/2009 | Logan et al. | 700/94 |
| 2009/0287583 A1 | 11/2009 | Holmes | |
| 2009/0290718 A1 | 11/2009 | Kahn et al. | |
| 2009/0299745 A1 | 12/2009 | Kennewick et al. | |
| 2009/0299849 A1 | 12/2009 | Cao et al. | |
| 2009/0307162 A1 | 12/2009 | Bui et al. | |
| 2010/0005081 A1 | 1/2010 | Bennett | |
| 2010/0023320 A1 | 1/2010 | Di Cristo et al. | |
| 2010/0036660 A1 | 2/2010 | Bennett | |
| 2010/0042400 A1 | 2/2010 | Block et al. | |
| 2010/0088020 A1 | 4/2010 | Sano et al. | |
| 2010/0138215 A1 | 6/2010 | Williams | |
| 2010/0145700 A1 | 6/2010 | Kennewick et al. | |
| 2010/0204986 A1 | 8/2010 | Kennewick et al. | |
| 2010/0217604 A1 | 8/2010 | Baldwin et al. | |
| 2010/0228540 A1 | 9/2010 | Bennett | |
| 2010/0235341 A1 | 9/2010 | Bennett | |
| 2010/0257160 A1 | 10/2010 | Cao | |
| 2010/0262599 A1 | 10/2010 | Nitz | |
| 2010/0277579 A1 | 11/2010 | Cho et al. | |
| 2010/0280983 A1 | 11/2010 | Cho et al. | |
| 2010/0286985 A1 | 11/2010 | Kennewick et al. | |
| 2010/0299142 A1 | 11/2010 | Freeman et al. | |
| 2010/0312547 A1 | 12/2010 | van Os et al. | |
| 2010/0318576 A1 | 12/2010 | Kim | |
| 2010/0332235 A1 | 12/2010 | David | |
| 2010/0332348 A1 | 12/2010 | Cao | |
| 2011/0047072 A1 | 2/2011 | Ciurea | |
| 2011/0060807 A1 | 3/2011 | Martin et al. | |
| 2011/0082688 A1 | 4/2011 | Kim et al. | |
| 2011/0112827 A1 | 5/2011 | Kennewick et al. | |
| 2011/0112921 A1 | 5/2011 | Kennewick et al. | |
| 2011/0119049 A1 | 5/2011 | Ylonen | |
| 2011/0125540 A1 | 5/2011 | Jang et al. | |
| 2011/0130958 A1 | 6/2011 | Stahl et al. | |
| 2011/0131036 A1 | 6/2011 | Di cristo et al. | |
| 2011/0131045 A1 | 6/2011 | Cristo et al. | |
| 2011/0143811 A1 | 6/2011 | Rodriguez | |
| 2011/0144999 A1 | 6/2011 | Jang et al. | |
| 2011/0161076 A1 | 6/2011 | Davis et al. | |
| 2011/0161309 A1 | 6/2011 | Lung et al. | |
| 2011/0175810 A1 | 7/2011 | Markovic et al. | |
| 2011/0184730 A1 | 7/2011 | LeBeau et al. | |
| 2011/0218855 A1 | 9/2011 | Cao et al. | |
| 2011/0231182 A1 | 9/2011 | Weider et al. | |
| 2011/0231188 A1 | 9/2011 | Kennewick et al. | |
| 2011/0264643 A1 | 10/2011 | Cao | |
| 2011/0279368 A1 | 11/2011 | Klein et al. | |
| 2011/0306426 A1 | 12/2011 | Novak et al. | |
| 2012/0002820 A1 | 1/2012 | Leichter | |
| 2012/0016678 A1 | 1/2012 | Gruber et al. | |
| 2012/0020490 A1 | 1/2012 | Leichter | |
| 2012/0022787 A1 | 1/2012 | LeBeau et al. | |
| 2012/0022857 A1 | 1/2012 | Baldwin et al. | |
| 2012/0022860 A1 | 1/2012 | Lloyd et al. | |
| 2012/0022868 A1 | 1/2012 | LeBeau et al. | |
| 2012/0022869 A1 | 1/2012 | Lloyd et al. | |
| 2012/0022870 A1 | 1/2012 | Kristjansson et al. | |
| 2012/0022874 A1 | 1/2012 | Lloyd et al. | |
| 2012/0022876 A1 | 1/2012 | LeBeau et al. | |
| 2012/0023088 A1 | 1/2012 | Cheng et al. | |
| 2012/0034904 A1 | 2/2012 | LeBeau et al. | |
| 2012/0035908 A1 | 2/2012 | LeBeau et al. | |
| 2012/0035924 A1 | 2/2012 | Jitkoff et al. | |
| 2012/0035931 A1 | 2/2012 | LeBeau et al. | |
| 2012/0035932 A1 | 2/2012 | Jitkoff et al. | |
| 2012/0042343 A1 | 2/2012 | Laligand et al. | |
| 2012/0137367 A1 | 5/2012 | Dupont et al. | |
| 2012/0173464 A1 | 7/2012 | Tur et al. | |
| 2012/0265528 A1 | 10/2012 | Gruber et al. | |
| 2012/0271676 A1 | 10/2012 | Aravamudan et al. | |
| 2012/0311583 A1 | 12/2012 | Gruber et al. | |
| 2013/0110520 A1 | 5/2013 | Cheyer et al. | |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 0 981 236 A1 | 2/2000 |
| EP | 1245023 A1 | 10/2002 |
| EP | 1 311 102 A1 | 5/2003 |
| EP | 2 109 295 A1 | 10/2009 |
| GB | 2293667 A | 4/1996 |
| JP | 06 019965 | 1/1994 |
| JP | 11-006743 | 1/1999 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-2007-0057496 | 6/2007 |
| KR | 10-0776800 B1 | 11/2007 |

(56) References Cited

FOREIGN PATENT DOCUMENTS

| | | |
|---|---|---|
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| NL | 1014847 | 10/2001 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages. .
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 9117, Revised Feb. 1991, 24 pages.

(56) References Cited

OTHER PUBLICATIONS

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, A Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/p.-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés àmain levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http:// www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http:// www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

(56) References Cited

OTHER PUBLICATIONS

YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).
Notification Concerning Transmittal of International Preliminary Report on Patentability and the Written Opinion for PCT Patent Application No. PCT/US2009/051954 mailed on Mar. 24, 2011, 8 pages.
Glass, J., et al., "Multilingual Spoken-Language Understanding in the MIT Voyager System," Aug. 1995, http://groups.csail.mitedu/sIs/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc.* v. *West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
Elio, R. et al., "On Abstract Task Models and Conversation Policies," http://webdocs.cs.ualberta.ca/~ree/publications/papers2/ATS.AA99.pdf, May 1999, 10 pages.
Rice, J., et al., "Using the Web Instead of a Window System," Knowledge Systems Laboratory, CHI '96 Proceedings: Conference on Human Factors in Computing Systems, Apr. 13-18, 1996, Vancouver, BC, Canada, 14 pages.
Anhui USTC iFLYTEK Co., Ltd., Flytek Research Center Information Datasheet, Oct. 15, 2004, http://www.iflttek.com/english/Research.htm, 3 pages.
Borden IV, G.R., "An Aural User Interface for Ubiquitous Computing," Proceedings of the 6th International Symposium on Wearable Computers, 2002, IEEE, 2 pages.
"Digital Audio in the New Era," Electronic Design and Application, Issue 6, Jun. 30, 2003, 3 pages.
Macsimum News, "Apple files patent for an audio interface for the iPod," posted May 4, 2006, http://www.macsimumnews.com/index.php/archive/apple_files_patent_for_an_audio_interface_for_the_ipod, 8 pages.
"Mobile Speech Solutions, Mobile Accessibility," SVOX AG Product Information Sheet, http://www.svox.com/site/bra840604/con782768/mob965831936.asp?osLang=1, 1 page.
"PhatNoise", Voice Index on Tap, Kenwood Music Keg, Jul. 13, 2006, http://www.phatnoise.com/kenwood/kenwoodssamail.html, 1 page.
Ricker, T., "Apple patents audio user interface," Engadget, posted May 4, 2006, http://www.engadget.com/2006/05/04/apple-patents-audio-user-interface, 6 pages.
"Windows XP: A Big Surprise!—Experiencing Amazement from Windows XP," New Computer, Issue 2, Feb. 28, 2002, 8 pages.
International Search Report and Written Opinion dated Nov. 3, 2005, received in International Application No. PCT/US2004/016519, which corresponds to U.S. Appl. No. 10/623,339, 25 pages (Beaman).
Partial International Search Report and Invitation to Pay Additional Fees dated Aug. 4, 2005, received in International Application No. PCT/US2004/016519, 6 pages (Beaman.).
Chinese Office Action dated Oct. 9, 2009 for Application No. 200480026208.5, 11 pages.
Chinese Office Action dated Feb. 6, 2009 for Application No. 200480026208.5, 28 pages.
Chinese Office Action dated May 25, 2007 for Application No. 200480026208.5, 29 pages.
European Office Action dated May 11, 2010 for Application No. 04 753 362.5-1245, 9 pages.
European Office Action dated May 26, 2008 for Application No. 04 753 362.5-1245, 6 pages.
European Office Action dated Nov. 14, 2006 for Application No. 04 753 362.5-1245, 7 pages.
Hong Kong Request to Record Chinese Patent Application No. 200980135356.3, 8 pages.
German Office Action dated Aug. 29, 2012 for Application No. DE112009 002 183.2-53, 4 pages.
KIPO's Notice of Prliminary Rejection (English Translation) for Korean Patent Application No. 10-2011-7005433, 7 pages.
Notice of Allowance dated May 14, 2010, received in U.S. Appl. No. 10/623,339, 10 pages (Beaman).
Notice of Allowance dated Apr. 8, 2010, received in U.S. Appl. No. 10/981,993, 5 pages (Naik).
Final Office Action dated Aug. 3, 2009, received in U.S. Appl. No. 10/623,339, 13 pages (Beaman).
Final Office Action dated Dec. 28, 2007, received in U.S. Appl. No. 10/623,339, 18 pages (Beaman).
Final Office Action dated Feb. 19, 2010, received in U.S. Appl. No. 10/981,993, 18 pages (Naik).
Final Office Action dated Jun. 8, 2009, received in U.S. Appl. No. 10/981,993, 12 pages (Naik).
Final Office Action dated Aug. 5, 2008, received in U.S. Appl. No. 10/981,993, 26 pages (Naik).
Office Action dated Dec. 31, 2009, received in U.S. Appl. No. 10/623,339, 18 pages (Beaman).
Office Action dated Feb. 20, 2009, received in U.S. Appl. No. 10/623,339, 16 pages (Beaman).
Office Action dated Jul. 13, 2007 received in U.S. Appl. No. 10/623,339, 14 pages (Beaman).
Office Action dated Dec. 11, 2006 received in U.S. Appl. No. 10/623,339, 33 pages (Beaman).
Office Action dated Aug. 28, 2009, received in U.S. Appl. No. 10/981,993, 15 pages (Naik).
Office Action dated Dec. 23, 2008, received in U.S. Appl. No. 10/981,993, 11 pages (Naik).
Office Action dated Feb. 5, 2008, received in U.S. Appl. No. 10/981,993, 27 pages (Naik).
Office Action dated Nov. 6, 2009, received in U.S. Appl. No. 11/733,126, 16 pages (Naik).
Office Action dated Jun. 9, 2009, received in U.S. Appl. No. 11/733,126, 15 pages (Naik).
Office Action dated Jan. 26, 2009, received in U.S. Appl. No. 11/733,126, 15 pages (Naik).
Office Action dated Sep. 3, 2008, received in U.S. Appl. No. 11/733,126, 21 pages (Naik).
Office Action dated Feb. 4, 2008, received in U.S. Appl. No. 11/733,126, 22 pages (Naik).
Japanese Office Action for Application No. 2011-525045 due on Apr. 24, 2013, 3 pages.
Acero, A., et al., "Environmental Robustness in Automatic Speech Recognition," International Conference on Acoustics, Speech, and Signal Processing (ICASSP'90), Apr. 3-6, 1990, 4 pages.

(56) References Cited

OTHER PUBLICATIONS

Acero, A., et al., "Robust Speech Recognition by Normalization of the Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 912, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, ©1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkelev. EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 912, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., Ed, Directions and Challenges,15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

(56) References Cited

OTHER PUBLICATIONS

Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4-93 ©1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.

(56) References Cited

OTHER PUBLICATIONS

Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based $N$-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "Matlab Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages, Jul. 28, 2010.
Wikipedia, "Minimum Phase," Wikipedia, the free encyclopedia, http://en.wikipedia.org/wiki/Minimum_phase, 8 pages, Jul. 28, 2010.
Wolff, M., "Poststructuralisnn and the Artful Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Korean Notice of Final Rejection (English Translation) due May 30, 2013 for Korean Patent Application No. 10-2011-7005433, 11 pages.

(56) References Cited

OTHER PUBLICATIONS

International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Agnäs, MS., et al., "Spoken Language Translator: First-Year Report," Jan. 1994, SICS (ISSN 0283-3638), SRI and Tella Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association fo Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam/sri/com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Contraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceesings of the Americas Conference on Information system (AMCIS), 4 pages.
Carter,D., "Lexical Acquisition in the Core Language Engine,"1989, Proceedings of the Fourth Conference of the Eurpoean Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al, "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for information Retrieval Using an Inferential Question-Answering with Natural-Language Input," Nov. 1972, SRI International, 198 Pages.
Coles, L. S., "The Application of Theorem Proving to information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V.; et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.

(56) References Cited

OTHER PUBLICATIONS

Decker, K., et al.; "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University; paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J.; et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of U.S. Patent No. 7,177,798, Mar. 22, 2013, 1 page.

Exhibit 1, "Natural Language Interface Using Constrained Intermediate Dictionary of Results," List of Publications Manually reviewed for the Search of U.S. Patent No. 7,177,798, Mar. 22, 2013, 1 page.

Ferguson, G., et al., "TRIPS: An Integrated intelligent Problem-Solving Assistant," 1998, Proceedings of the Fifteenth National Conference on Artificial intelliaence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

Grosz, B., et al., "Team: An Experiment in the Desion of Transportable Natural-Language Interfaces," Artificial Intelligence, vol. 32, 1987, 71 pages.

Grosz, B., "Team: A Transportable Natural-Language Interface System," 1983, Proceedings of the First Conference on Applied Natural Language Processing, 7 pages.

Guide, G., et al, "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://vwww.informatik.uni-trier.de/~leyl/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al,, "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages. Best Copy Available.

Hendrix, G., "The Lifer Manual: A Guide to Building Practical Natural Language interfaces," Feb. 1977, SRI International, 76 pages.

Hendrix, G., et al., "Transportable Natural-Language Interfaces to Databases," Apr. 30, 1981, SRI International, 13 pages.

Hirschman. L. et al., "Multi-Site Data Collection and Evaluation in Spoken Language Understanding," 1993, Proceedings of the workshop on Human Language Technology, 6 pages.

Hobbs. J., et al., "Fastus: A System for Extracting Information from Natural-Language Text," Nov. 19, 1992, SRI international, Artificial lntelligence Center, 26 pages.

Hobbs, J., et al.,"Fastus: Extracting information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., et al., "The Sphinx-II Speech Recognition System: An Overview," Jan. 15, 1992, Computer, Speech and Language, 14 pages.

Issar. S., et al., "CMU's Robust Spoken Language Understanding System," 1993, Proceedings of Eurospeech, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium. 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B:, "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Katz, B. et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "Rextor: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

(56) References Cited

OTHER PUBLICATIONS

Konolige, K., "A Framework for a Portable Natural-Language Interface to Large Data Bases," Oct. 12, 1979, SRI International, Artificial Intelligence Center, 54 pages.

Laird, J., et al., "Soar: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology. 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et ai., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language Interface to command languages," Natural Language Engineering 2 (3), © 1994 Cambridge University Press, 19 pages. Best Copy Available.

Milstead, J., et al., "Metadata: Cataloging by Any Other Name . . ." Jan. 1999, Online, Copyright © 1999 Information Today, Inc., 18 pages.

Minker, W., et al., "Hidden Understanding Models for Machine Translation," 1999, Proceedings of ETRW on interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS" 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

Oaa, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International , 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages, http://arxiv.org/abs/cmp-Ig/9605015.

Rayner, M., "Abductive Equivalential Translation and its application to Natural Language Database Interfacing," Sep. 1993 Dissertation paper, SRI international, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dbip.uni-trier.de/db/conf/interspeech.eurospeech1993.html#RaynerBCCDGKKLPPS93.

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H,, "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

(56) References Cited

OTHER PUBLICATIONS

Shinkle, L., "Team User's Guide," Nov. 1984, SRI International, Artificial Intelligence Center, 78 pages.
Shklar, L., et al., "Info Harness: Use of Automatically Generated Metadata for Search and Retrieve Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828054033/http://www.speechatsri.com/products/eduspeak.shtml.
Starr. B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Nature Language Workshop, 6 pages.
Stickel, "A Nonclausal Connection-Graph Resolution Theorem-Proving Program," 1982, Proceedings of AAAI'82, 5 pages.
Sugumaran, V., "A Distributed intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The Retsina Mas Infrastructure," 2003, Autonomous Agents and Multi-Agent Systems, vol. 7, 20 pages.
Tyson. M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2895-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, Eurospeech, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
DE Oral Hearing Summons for Application No. 112009 002 183.2-53, 11 pages, Jan. 23, 2013.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
EP Examination Report dated Oct. 9, 2012 for Application No. 09790882.6, 11 pages, Oct. 9, 2012.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Roddy, D., et al., "Communication and Collaboration in a Landscape of B2B eMarketplaces," VerticalNet Solutions, white paper, Jun. 15, 2000, 24 pages.

\* cited by examiner

AUDIO USER INTERFACE

CROSS-REFERENCES TO RELATED APPLICATIONS

This application is related to U.S. patent application Ser. No. 10/981,993, filed Nov. 4, 2004 and entitled "Audio User Interface For Computing Devices," and to U.S. patent application Ser. No. 10/623,339, filed Jul. 18, 2003 and entitled "Voice Menu System," the entire disclosures of which are herein incorporated by reference for all purposes.

FIELD OF THE INVENTION

This disclosure relates generally to audio user interfaces and, more specifically, to techniques for providing audio user interfaces for computing devices.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

Users listen to, watch, or otherwise receive and consume content in a variety of contexts. For example, it is common to listen to music while driving, riding public transit, exercising, hiking, doing chores, or the like. Additionally, users now are more often using media players to receive radio, television, and satellite broadcasts, Global Positioning and other broadcast-based location services for navigation and recreation in addition to the playback of content stored on the media players.

Conventionally, a media player or portable media player can be capable of playing media, such as audio (e.g., songs) or video (e.g., movies) for the benefit of its user. When playing audio, if the media player includes a display, the display can present the name of the song, artist, and other information pertaining to the song. In the case of playing a video, the display can be used to present the video.

In order to achieve portability, many hand-held devices can use user interfaces that present various display screens to the user for interaction that is predominantly visual. Users can interact with the user interfaces to manipulate a scroll wheel and/or a set of buttons to navigate display screens to thereby access functions of the hand-held devices. However, these user interfaces can be difficult to use at times for various reasons. One reason is that the display screens may tend to be small in size and form factor and therefore difficult to see. Another reason is that a user may have poor reading vision or otherwise be visually impaired. Even if the display screens can be perceived, a user will have difficulty navigating the user interface in situations when a user cannot shift visual focus away from an important activity and towards the user interface. Such activities include, for example, driving an automobile, exercising, and crossing a street.

Accordingly, what is desired are improved methods and apparatus for solving some of the problems discussed above. Additionally, what is desired are improved methods and apparatus for reducing some of the drawbacks discussed above.

BRIEF SUMMARY OF THE INVENTION

In various embodiments, the experience of a user interactive with an electronic device, such as a media player or portable media device, can be enhanced through the incorporation of an audio user interface that provides an intelligent path for determining whether appropriate audio dialogs for the audio user interface are available. For example, based on whether the electronic device has a broadband connection to a communications network (e.g., the Internet), a determination may be made to request audio files of a first type or category (e.g., high quality voice recordings) from a voice server to be streamed to the electronic device for output with the audio user interface. In another example, a determination may be made to use only audio files of a second type or category (e.g., low quality voice recordings) which are available on a media storage device accessible to the electronic device. In yet another example, absent availability of pre-recorded voice audio data, a determination may be made to use one or more voice synthesis or text-to-speech techniques to create audio data of a third category for audio prompts for the audio user interface.

In some embodiments, a user of an electronic device, such as a media player or portable media device, can determine the quality of audio prompts that are to be presented (e.g., played) for the audio user interface. The user may provide one or more user preferences indicating whether pre-recorded audio data should be used, whether audio prompts synthesized using one or more synthesis techniques should be used, or whether traditional beeps or other non-voice audio data should be used for the audio user interface. Accordingly, an electronic device, such as a media player or portable media device, with or without a display can be enhanced with an audio user interface to facilitate user interactions based on availability of service or other selection criteria.

In one embodiment, input indicative of an interaction of the user with a user interface associated with an electronic device, such as a media player or portable media device, may be received. The user may interact with the media player by pressing buttons, such as a play/pause button or selecting/highlighting a menu item of a graphical user interface. The electronic device may identify an audio prompt associated with audibilizing the interaction of the user with the user interface. The electronic device may determine whether one of a plurality of categories of audio data corresponding to the audio prompt is available to the media player. For example, the electronic device may determine whether pre-recorded celebrity-voice audio files are stored on an internal storage, whether a voice synthesis module or text-to-speech engine can synthesize numbers, or whether a voice server is able to stream audio data to the electronic device for the audio user interface.

A portion of audio data of a first category may then be output or otherwise presented at the electronic device. In some embodiments, playback of a media file can be paused or suspended in response to the output of the portion of audio data from the first source. A playback volume of a media file may be reduced or muted in response to the output of the portion of audio data from the first source.

A further understanding of the nature, advantages, and improvements offered by those inventions disclosed herein may be realized by reference to remaining portions of this disclosure and any accompanying drawings.

BRIEF DESCRIPTION OF THE DRAWINGS

In order to better describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

DETAILED DESCRIPTION OF THE INVENTION

Various embodiments can be well suited for electronic devices having audio playback capabilities, such as media devices (e.g., digital media players or portable MP3 players) or other portable multi-function devices (e.g., mobile telephone or Personal Digital Assistant). For example, portable devices can often store and play digital media assets (media items), such as music (e.g., songs), videos (e.g., movies), audio books, podcasts, meeting recordings, and/or other multimedia recordings. Portable devices, such as portable media players or other portable multi-function devices, can also be small and highly portable. Often, portable devices are handheld devices, such as hand-held media players or hand-held multi-function devices, which can be easily held by and within a single hand of a user. Portable devices can also be pocket-sized, miniaturized, or wearable.

In various embodiments, the experience of a user interactive with an electronic device, such as a media player or portable media device, can be enhanced through the incorporation of an audio user interface that provides an intelligent path for determining whether appropriate audio dialogs for the audio user interface are available. For example, based on whether the electronic device has a broadband connection to a communications network (e.g., the Internet), a determination may be made to request audio files of high quality voice recording from a voice server to be streamed to the electronic device for output with the audio user interface. In another example, a determination may be made to use only audio files of low quality voice recordings that are available on a media storage device accessible to the electronic device. In yet another example, absent availability of pre-recorded voice audio data, a determination may be made to use one or more voice synthesis or text-to-speech techniques to create audio prompts for the audio user interface.

In some embodiments, a user of an electronic device, such as a media player or portable media device, can determine the quality of audio prompts that are to be presented (e.g., played) for the audio user interface. The user may provide one or more user preferences indicating whether pre-recorded audio data should be used, whether audio prompts synthesized using one or more synthesis techniques should be used, or whether traditional beeps or other non-voice audio data should be used for the audio user interface. Accordingly, an electronic device, such as a media player or portable media device, with or without a display can be enhanced with an audio user interface to facilitate user interactions based on availability of service or other selection criteria.

Aspects of the environments within which various examples and/or embodiments of those invention found within the specification operate will first be described.

Figure 1:
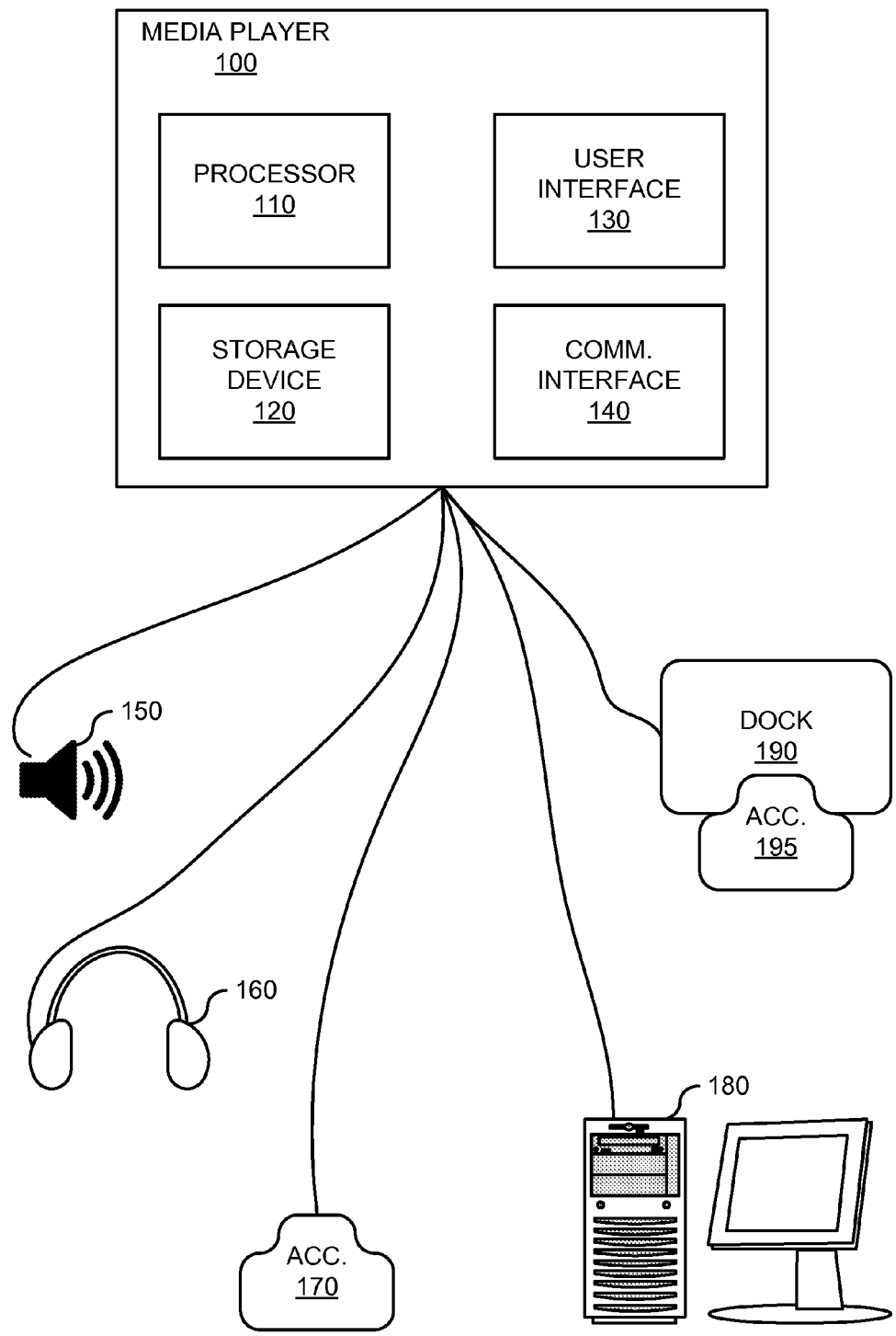
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 can be the iPod® media player, which is available from Apple, Inc. of Cupertino, Calif. Another example of media player 100 can be a personal computer, such as a laptop or desktop.

In this example, media player 100 includes processor 110, storage device 120, user interface 130, and communications interface 140. Processor 110 can control various functionalities associated with media player 100. Media play 100 may output audio content, video content, image content, and the like. Media player 100 may also output metadata or other information associated with content, such as track information and album art.

Typically, a user may load or store content onto media player 100 using storage device 120. Storage device 120 can include read-only memory (ROM), random access memory (RAM), non-volatile memory, flash memory, floppy disk, hard disk, or the like. A user may interact with user interface 130 of media player 100 to view or consume content. Some examples of user interface 130 can include buttons, click wheels, touch pads, displays, touch screens, and other input/output devices.

Media player 100 can include one or more connectors or ports that can be used to load content, retrieve content, interact with applications running on media player 100, interface with external devices, and the like. In this example, media player 100 includes communications interface 140. Some examples of communications interface 140 can include universal serial bus (USB) interfaces, IEEE 1394 (or FireWire/ iLink®) interfaces, universal asynchronous receiver/transmitters (UARTs), wired and wireless network interfaces, transceivers, and the like. Media player 100 may connect to devices, accessories, private and public communications networks (e.g., the Internet), or the like, using communications interface 140.

In one example, media player 100 can be coupled via a wired and/or wireless connector or port to output audio and/or other information to speakers 150. In another example, media player 100 may be coupled via a wired and/or wireless connector or port to output audio and/or other information to headphones 160. In yet another example, media player 100 may be coupled via a wired and/or wireless connector or port to interface with an accessory 170 or a host computer 180. The same connector or port may enable different connections at different times.

Media player 100 can be physically inserted into docking system 190. Media player 100 may be coupled via a wired and/or wireless connector or port to interface with docking system 190. Docking system 190 may also enable one or more accessory devices 195 to couple with wires or wirelessly to interface with media player 100. Many different types and functionalities of accessory devices 170 and 195 can interconnect to or with media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

In various embodiments, media player 100 can receive content or other media assets from a computer system (e.g., host computer 160). The computer system may serve to enable a user to manage media assets stored on the computer system and/or stored on media player 100. As an example, communications interface 140 may allow media player 100 to interface with host computer 160. Host computer 160 may execute a media management application to manage media assets, such as loading songs, movies, photos, or the like, onto media player 100. The media management application may also create playlists, record or rip content, schedule content for playback or recording, or the like. One example of a media management application can be iTunes®, produced by Apple, Inc. of Cupertino, Calif.

In various embodiments, media player 100 may include an audio user interface. Embodiments of the audio user interface may present or otherwise output audio prompts selected from an audio dialog for playback as a user interacts with media player 100 (e.g., as the user presses a button, touches a touch screen, or selects items of a graphical user interface). The audio prompts may include audio indicators that allow a user to focus his or her visual attention upon other tasks such as driving an automobile, exercising, or crossing a street, yet still enable the user to interact with user interface 130. As examples, the audio prompts may audibilize the spoken name or description of a depressed hardware button, the spoken activation of a virtual button or control, or the spoken version of a user interface selection, such as a selected function or a selected (e.g., highlighted) menu item of a display menu. The audio prompts may include pre-recorded voice data or be produced by voice or speech generation techniques.

In one aspect, embodiments of media player 100 may include techniques for providing an audio user interface an electronic device that efficiently leveraging availability of audio prompt sources for the audio user interface. For example, media player 100 may selectively output audio prompts from different audio dialogs based on whether a connection to the source of an audio dialog is available, whether a higher quality source is available, or the like. In one example, a user of media player 100 may hear low quality voice audio prompts or audio prompts synthesized by media player 100 until connecting to the Internet, upon which higher quality pre-recorded voice audio prompts may be downloaded or streamed to the audio user interface. Thus, in various embodiments, media player 100 may determine the availability of a source of audio prompts for the audio user interface, and automatically switch form one source to another to selectively provide one the best available audio feedback to the user.

Figure 2:
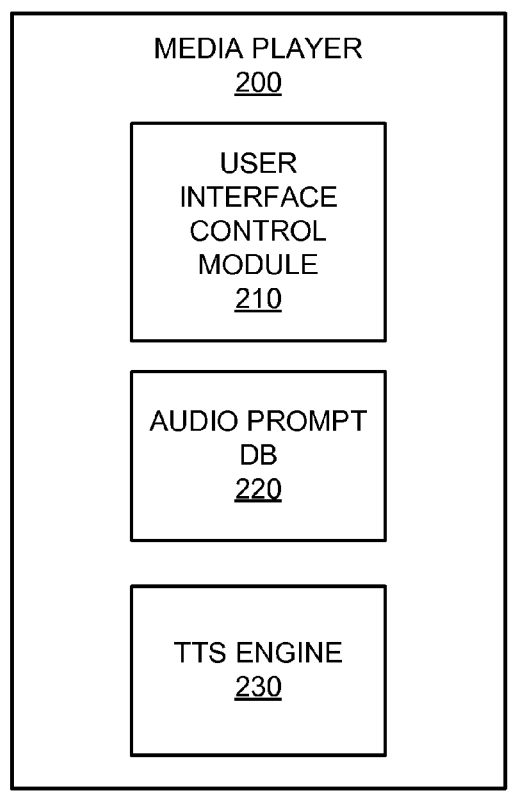
FIG. 2 is a block diagram of a media player that may provide pre-recorded or synthesized audio prompts in one embodiment according to the present invention.

FIG. 2 is a block diagram of media player 200 that may provide pre-recorded or synthesized audio prompts in one embodiment according to the present invention. In this example, media player 200 can be embodied as media player 100 and may include a portable computing device dedicated to processing content or other media assets, such as audio, video, or images. For example, media player 200 can be a music player (e.g., MP3 player), a game player, a video player, a video recorder, a camera, an image viewer, a mobile phone (e.g., cell phones), a personal hand-held device, and the like. These devices are generally battery operated and highly portable so as to allow a user to listen to music, play games or video, record video or take pictures wherever the user travels.

In one implementation, media player 200 may include a hand-held device that is sized for placement into a pocket or hand of the user. By being hand-held, media player 200 may be relatively small and easily handled and utilized by its user. By being pocket-sized, the user does not have to directly carry media player 200 and therefore the device can be taken almost anywhere the user travels (e.g., the user is not limited by carrying a large, bulky and often heavy device, as in a portable computer). Furthermore, media player 200 may be operated by the user's hands so that no reference surface such as a desktop is needed. In alternative embodiments, media player 200 may be computing devices that are not specifically limited to playing media files. For example, media player 200 can also be a mobile telephone or a personal digital assistant.

In this example, media player 200 can include user interface control module 210, audio prompt database 220, and text-to-speech engine 230. User interface control module 210 can include hardware and/or software elements for managing a user interface that allows a user to interact (e.g., navigate, initiate content playback, etc.) with media player 200. The user interface can, for example, allow the user of media player 200 to browse, sort, search, play, etc. content or other media assets resident on or otherwise accessible to media player 200. The user interface can also allow the user of media player 200 to download (add) or delete (remove) media items from media player 200.

Interaction with the user interface of media player 200 can cause audio prompts for an audio user interface to be played back, such as through earphones or speakers. Audio prompt database 220 can include hardware and/of software elements for storing audio data and audio files for audio prompts. In some embodiments, the audio files may include audio prompts that have be pre-recorded and stored on media player 200. In further embodiments, the audio files may include audio prompts streamed from one or more computers and cached in audio prompt database 220 for subsequent use. In various embodiments, the audio files may include audio prompts generated by media player 200 or by another device using one or more voice synthesis techniques. Audio prompt database 220 may include other content or media assets.

Text-to-speech conversion engine 230 can include hardware and/or software elements for converting data, such as text, into audio files or audio data that can be played to generate a user interface audio prompt that audibilizes (e.g., verbalizes in a human-like voice or in spoken form) data, such as text string. Such text-to-speech (TTS) engines can use various techniques for creating the audio data or audio files. For example, some algorithms use a technique of breaking a word down into fragments or syllables for which a certain sound is then designated. Then, a word can be verbalized through combining individual sounds. In the case where the media content pertains to music, these text strings may, for example, correspond to song titles, album names, artist names, contact names, addresses, phone numbers, and playlist names.

In one example of operation, media player 200 may selectively provide audio prompts for an audio user interface based on availability of audio prompts for audio prompt database 220 and TTS engine 230. For example, media player 200 may selectively output audio prompts from audio prompts database 220 when pre-recorded audio prompts are available or otherwise stored in audio prompt database 220. Media player 200 may further selectively choose between audio prompts of various quality, such as presenting audio prompts of a higher quality or bit rate that those of a lower quality or bit rate. In another example, media player 100 may present voice prompts or audio prompts synthesized by TTS engine 230 due to the lack of pre-recorded audio prompts stored in audio prompt database 220 or in response to a user's preference for a particular simulated voice profile. In various embodiments, media player 100 may dynamically output audio prompts from audio prompts database 220 or TTS engine 230, or in combination.

In further embodiments, an electronic device, such as a media player or portable media device, may include an audio user interface provided by an audio user interface management system. An audio user interface management system can include a media playback device and one or more of a host computer or server computer system that facilitates providing the audio user interface on the media playback device. As an example, the host computer system may include a personal computer and the media playback device may include an MP3 player. In some embodiments, the media playback device may provide for multi-modal interaction with the user interface. For example, a user can interact with the user interface through audio and visual prompts.

Figure 3:
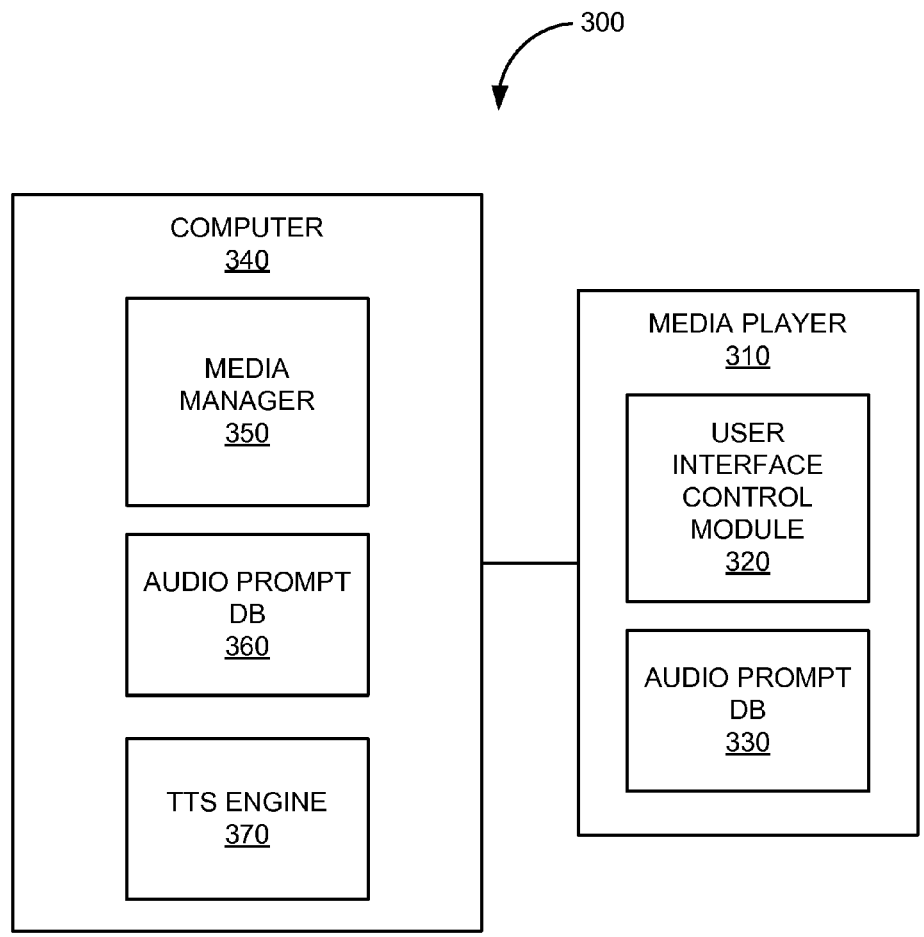
FIG. 3 is a block diagram of an audio user interface management system that may provide pre-recorded or synthesized audio prompts in one embodiment according to the present invention.

FIG. 3 is a block diagram of audio user interface management system 300 that may provide pre-recorded or synthesized audio prompts in one embodiment according to the present invention. In this example, management system 300 can include media player 310 and personal computer (host computer) 340. Media player 310 may be embodied as media player 100, as discussed above, and can be linked or coupled to personal computer 340.

Media player 310 may be embodied as media player 100 of FIG. 1, and can include, for example, a portable, battery-operated device. In one embodiment, media player 310 includes an MP3 player. Typically, media player 310 may store content or other media assets to one or different data storage devices (e.g., disk drives). Media player 310 may store content or other media assets in media files.

Media player 310 can include user interface control module 320 and audio prompt database 330. User interface control module 320 can include hardware and/or software elements for managing a user interface that allows a user to interact (e.g., navigate, initiate content playback, etc.) with media player 310. Interaction with the user interface of media player 310 can cause audio prompts for an audio user interface to be played back, such as through earphones or speakers. Audio prompt database 330 can include hardware and/of software elements for storing audio data and audio files for audio prompts.

Personal computer 340 can include media manager 350, audio prompt database 360, and text-to-speech (TTS) engine 370. Personal computer 340 may serve as a host computer system to media player 310. Personal computer 340 can also be any type of computer that acts as a server to media player 310, which is the client.

Media manager 350 can include hardware and/or software elements for that enable a user of personal computer 350 to directly manage content or other media assets stored on personal computer 340. Media manager 350 may further be configured to directly or indirectly manage content or other media assets stored on media player 310. In one example, media player 310 and personal computer 340 can be coupled using a peripheral cable. Typically, a peripheral cable can couple together data ports provided on media player 310 and personal computer 340. In some embodiments, the data ports can be FIREWIRE ports and the peripheral cable can be a FIREWIRE cable. In another example, the data ports can be Universal Serial Bus (USB) ports and the peripheral cable can be a USB cable. More generally, the peripheral cable may act as a data link. Media items can be transferred between media player 310 and personal computer 340 over the peripheral cable, and vice versa.

In various embodiments, media manager 350 may also include a user interface that allows a user to browse, sort, search, play, make playlists from, burn Compact Discs (CDs) of, etc. the content or other media assets resident on personal computer 340. The user interface can also allow the user of personal computer 340 to download (add) or delete (remove) media items from personal computer 340. In one embodiment, media manager 350 and its associated user interface are provided by iTunes™, from Apple Inc. of Cupertino, Calif.

Audio prompt database 360 of personal computer 340 may include hardware and/or software elements for storing audio data or audio files for audio prompts for an audio user interface associated with media player 310 or personal computer 340. Audio prompt database 330 may include audio prompts for audio dialogs that have been downloaded from the Internet, ripped from a CD, recorded by the user, or generated by TTS engine 370. TTS engine 370 may include hardware and/or software elements for converting information or data into audio files or voice data that can be played as audio prompts that audibilizes the information.

In one example, a synchronization operation between personal computer 340 and media player 310 may occur to upload audio prompts to or update audio prompts stored in audio prompt database 330 of media player 310 with audio prompts stored in audio prompt database 360 or generated by TTS engine 370. In one example, when comparison of the contents from respective databases indicate that there is a particular audio prompt resident on personal computer 340 that is not resident on media player 330, then the particular audio prompt may be transmitted (downloaded) to media player 310, e.g., using a wireless link or over a peripheral cable. Accordingly, a synchronization operation between personal computer 340 and media player 310 can ensure that media player 310 contains audio data or audio files appropriate for presenting a usable audio user interface.

The number of audio files to be downloaded onto media player 310 may depend upon user settings for the audio user interface. For example, a user may desire that audio files or other audio data stored in audio prompt database 360 be downloaded for association with all or a subset of options or features of the audio user interface on media player 310.

Figure 4:
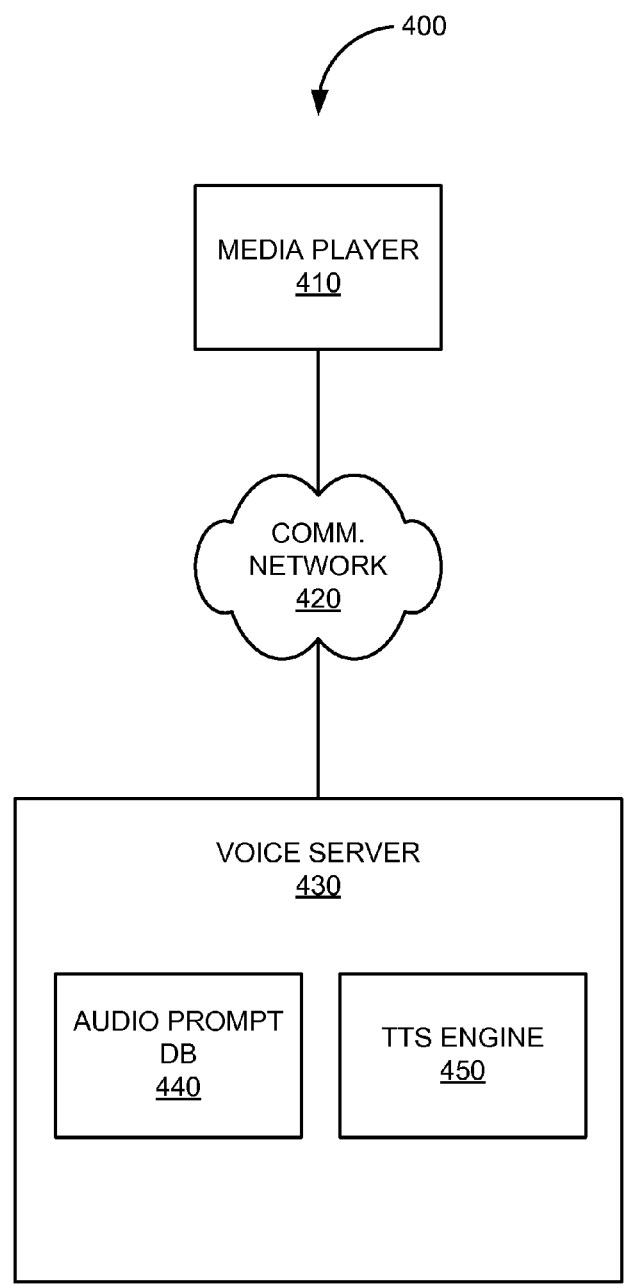
FIG. 4 is a block diagram of a streaming audio prompt system in one embodiment according to the present invention.

FIG. 4 is a block diagram of streaming audio prompt system 400 in one embodiment according to the present invention. In this example, media player 410 is linked to communications network 420. Media player 410 may be embodied as media player 200 of FIG. 2 or as media player 310 of FIG. 3.

Voice server 430 is also linked to communications network 420, and is able to communicate with media player 410.

In various embodiments, media player 410 may detect that a connection exists to voice server 430 via communications network 420. In one example of operation, media player 410 may select to receive audio prompts from voice server 430 for presentation with an audio user interface of media player 410. Media player 410 may generate one or more requests for an audio prompt, and upon receiving a request, voice server 430 may stream a corresponding audio prompt to media player 410 for output to a user.

Voice server 430 can include audio prompt database 440 and TTS engine 450. Audio prompt database 440 of voice server 430 may include hardware and/or software elements for storing audio data or audio files for audio prompts for an audio user interface associated with media player 410. Audio prompt database 330 may include audio prompts for audio dialogs that have been pre-recorded by one or more content producers, provided by content publishers, or generated by TTS engine 450. TTS engine 370 may include hardware and/or software elements for converting information or data into audio files or voice data that can be played as audio prompts that audibilizes the information.

Accordingly, media player 410 may selectively choose between the sources of audio prompts for an audio user interface to provide audio voice feedback to a user. Media player 410 may receive audio prompts (e.g., pre-recorded or synthesized) from voice server 430 until a connection is lost. At that point, media player 410 may automatically select audio prompts from a different source, such as an internal audio prompt database or speech synthesis module.

Figure 5:
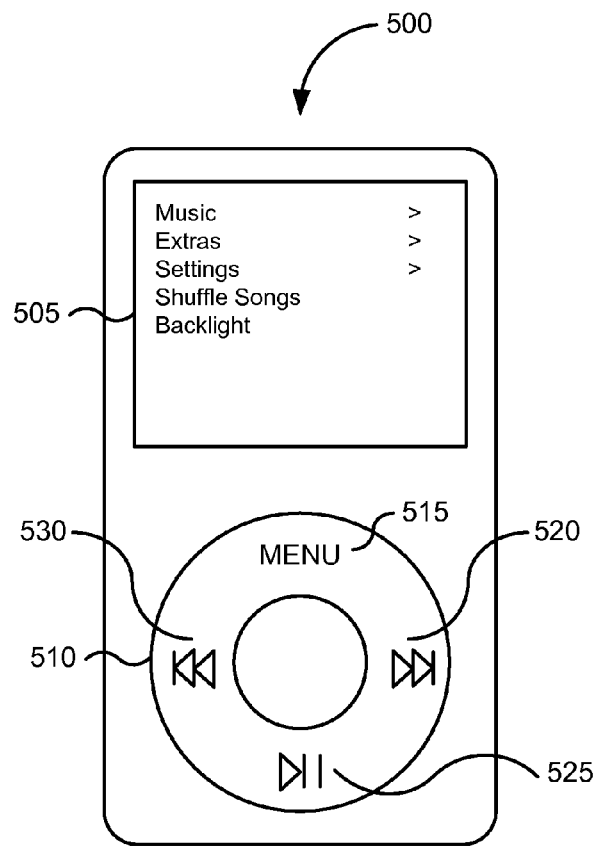
FIG. 5 illustrates a diagrammatic view of a media player and its associated user input controls in one embodiment according to the present invention.

FIG. 5 illustrates a diagrammatic view of media player 500 and its associated user input controls in one embodiment according to the present invention. Media player 500 can include any computer device for playing media files, such as song files. Media player 500 may contain memory that stores a media database and a play module for presenting or playing content or other media assets stored in the media database. A set of nested menus 505 may represent at least part of a user interface that allows a user to navigate through, select, and thereby listen to desired song files. It may be possible to reach a certain media file through different paths using the set of nested menus 505. The user interface may also allow users to navigate and select a desired function provided by media player 500.

FIG. 5 also illustrates representative user interface controls 510 of media player 500. According to one embodiment, user interface controls 510 include menu button 515, next button 520, play/pause button 525, and previous button 530. User interface control 510 may include a scroll wheel implemented as a rotating wheel apparatus that can rotate or a touch pad apparatus that understands a rotation user gesture. A user may press, rubs, or otherwise interact with user interface controls 510 to navigate through nested menus 505.

Figure 6:
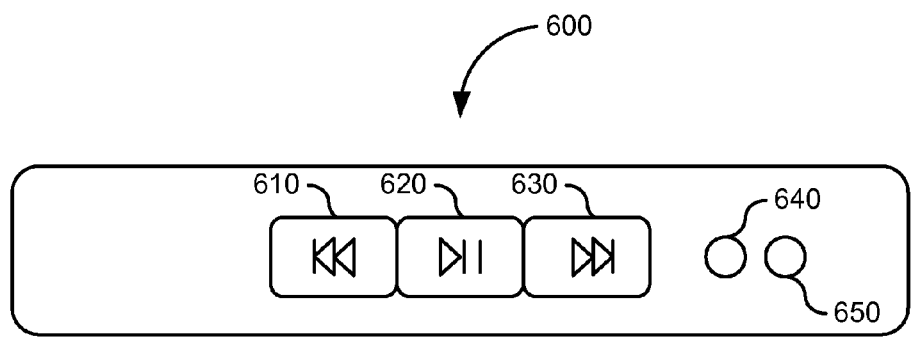
FIG. 6 illustrates a diagrammatic view of a media player and its associated user input controls in an alternative embodiment according to the present invention.

FIG. 6 illustrates a diagrammatic view of media player 600 and its associated user input controls in an alternative embodiment according to the present invention. Media player 600 can include previous button 610, play/pause button 620, and next button 630. LEDs 640 and 650 may be used to convey information to the user, such as to indicate power status or media playback status. In this example, media player 600 may not include a display configured to a graphical user interface, such as nested menus 505 of FIG. 5. Accordingly, a user interface that audibly conveys information about operation of media player 600 may dramatically enhance user experience.

Figure 7:
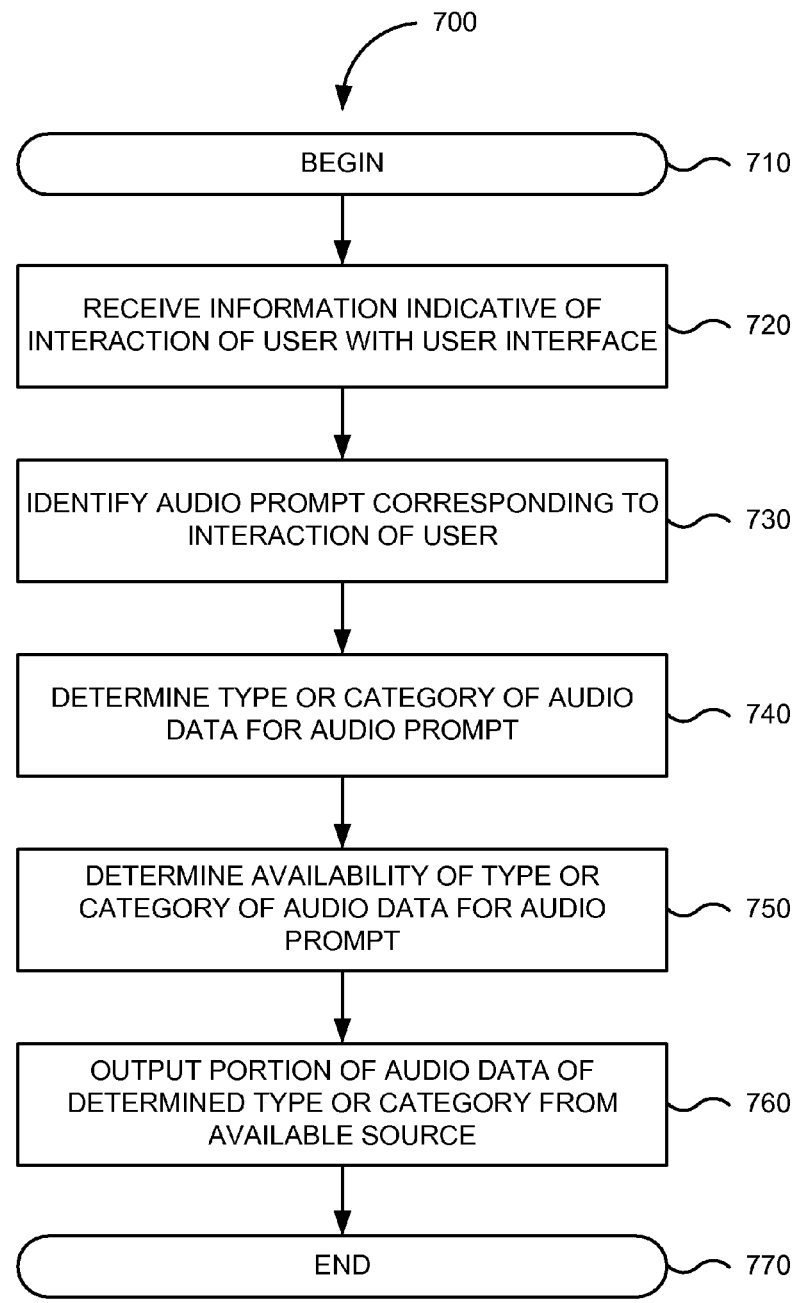
FIG. 7 is a simplified flowchart of a method for providing an audio user interface to a user of an electronic device in one embodiment according to the present invention.

FIG. 7 is a simplified flowchart of a method for providing an audio user interface to a user of an electronic device in one embodiment according to the present invention. The processing of method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. FIG. 7 begins in step 710.

In step 720, information indicative of an interaction of a user with a user interface is received. The information may include signals, messages, interrupts, input, or the like. The information may specify that a user has pressed or depressed a button, clicked a click-wheel, touched a touch screen, performed a gesture, highlighted or selected an element of a graphical user interface, or the like. The information may represent a single act of a user or a combination of acts.

In step 730, an audio prompt corresponding to the interaction of the user is identified. The audio prompt may include information identifying audio data that vocalizes, audibilizes, or otherwise provides feedback to a user of a registered interaction. In step 740, a type or category of audio data for the audio prompt is determined. In various embodiments, the audio prompt may be represented by different types or categories of audio data. A type or category of audio data may include, for example, audio data of different audible qualities, voice vs. non-voice, bit rate, compression, encoding, source, delivery mechanism, or the like. For example, synthesized audio data generated by a voice synthesis module may be used to provide audio prompts for numbers, dates, or the like. In another example, pre-recorded audio data that has been compressed may be used to provide audio prompts for button interactions, such as play, pause, next, back, forward, reverse, or the like. In yet another example, CD-quality pre-recorded audio data may be used to provide an entire set of audio prompts for numbers, dates, button presses, menu selections, and any other interaction of the user that may be included in a given audio user interface.

In step 750, availability of the determined type or category of audio data for the audio prompt is determined. For example, a selection can be made to use pre-recorded audio dialog (e.g., a set of pre-recorded audio files) for audio prompts of an audio user interface. An electronic device may check its internal storage to determine whether an audio file for the audio prompt exists. Alternatively, the electronic device may requests the audio file for the audio prompt from a host computer or a streaming voice server. In another example, a selection may be made to use pre-recorded audio data for some audio prompts and synthesized audio data for other audio prompts if pre-recorded audio prompts are not stored locally at the electronic device.

In step 760, a portion of audio data of the determined type or category is output from an available source. Accordingly, various embodiments may provide dynamic selection of different types or categories of audio data for audio prompts of an audio user interface. Additionally, some embodiments may provide mechanisms for getting the selected or identified type or categories of audio data to an electronic device for use as part of an audio user interface. FIG. 7 ends in step 770.

Figure 8A:
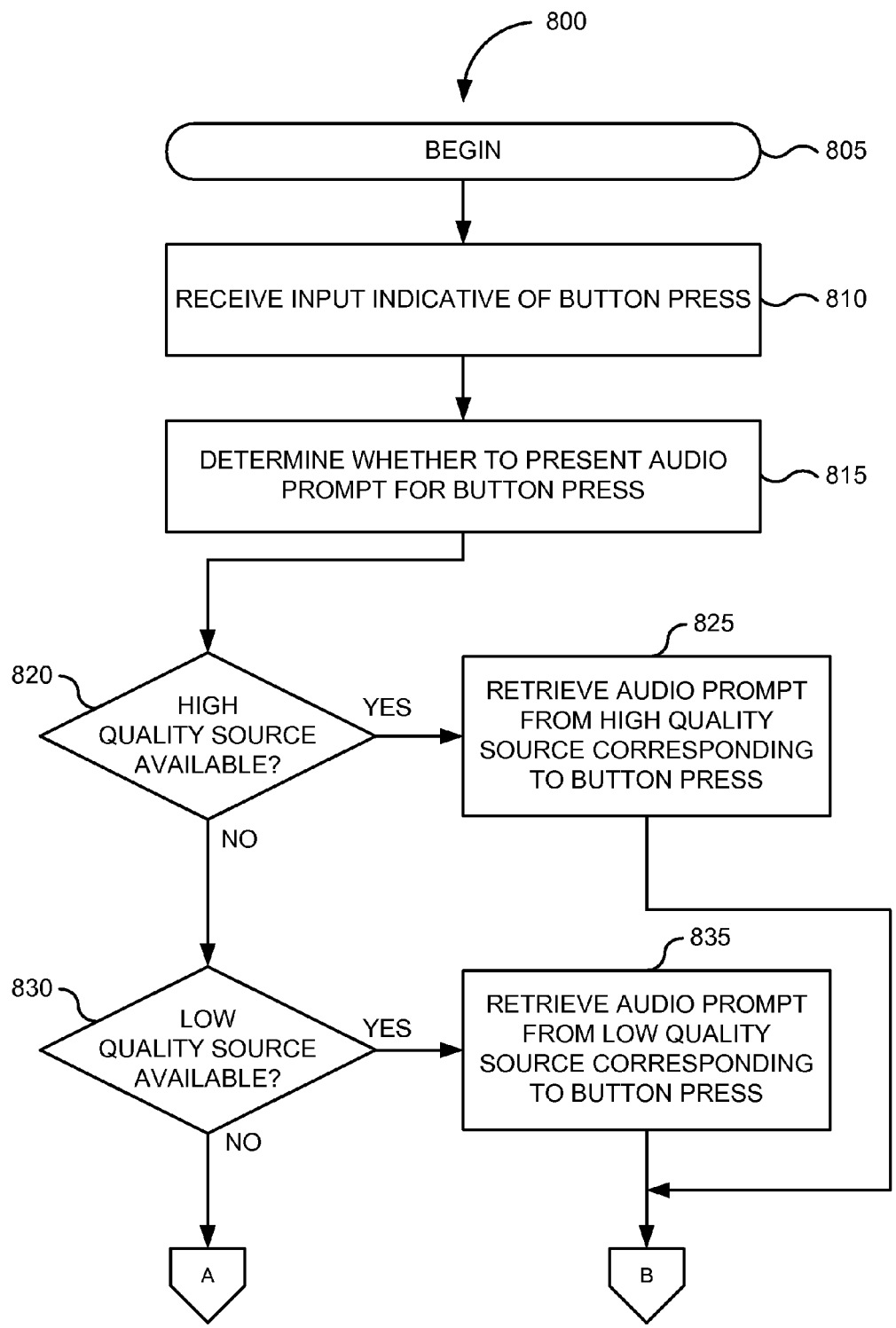
FIGS. 8A and 8B are a flowchart of a method for providing an electronic device with an audio user interface in an alternative embodiment according to the present invention.
Figure 8B:
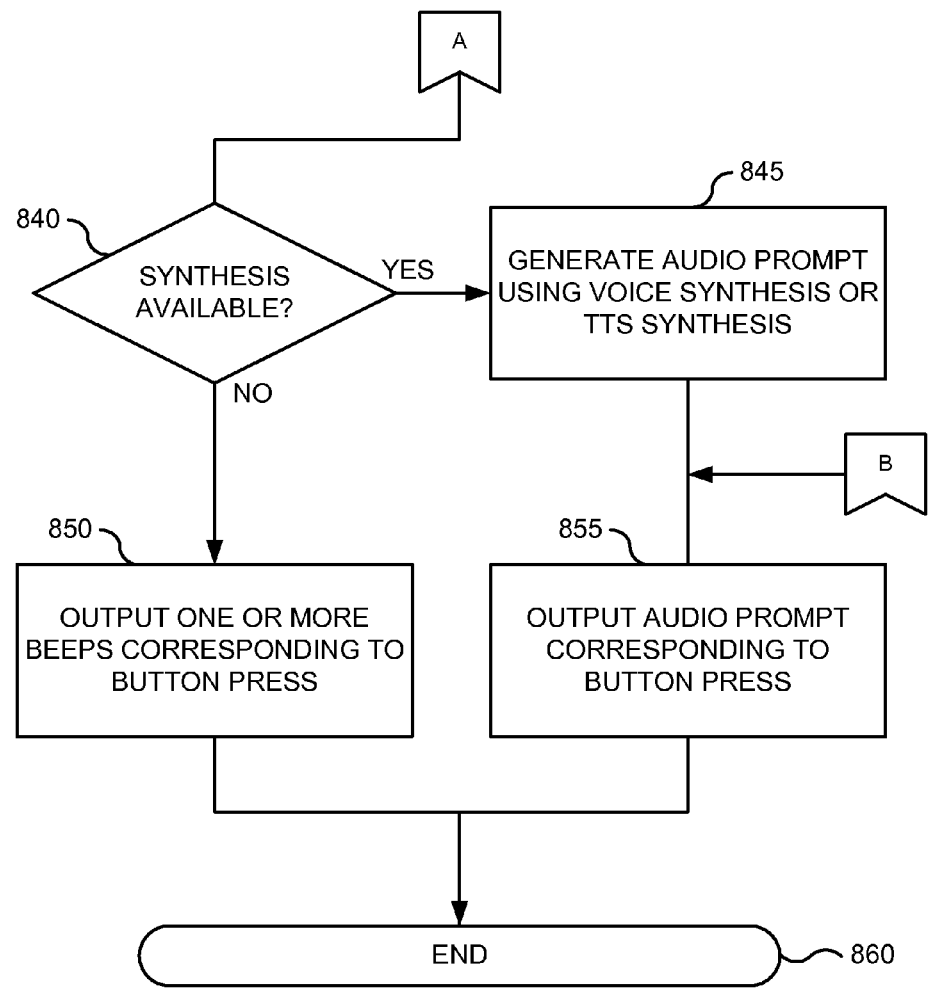

FIGS. 8A and 8B are a flowchart of method 800 for providing an electronic device with an audio user interface in one embodiment according to the present invention. Method 800 generally involves an intelligent decision path that determines whether an appropriate audio dialog for an audio user interface is available and obtaining the best available audio dialog for output to a user. FIG. 8A begins in step 805.

In step 810, input indicative of a button press is received. For example, a user may interface with user interface controls 510 of media player 500 of FIG. 5. Media player 500 may generate one or more analog or digital signals representative of a button press, touch, pressure, gesture, motion, or the like.

In step 815, a determination is made whether to present an audio prompt for the button press. In some embodiments, control selections are accompanied by an indication to output an audio prompt that confirms the selection to the user. For example, "play" can be audibilized to the user to provide feedback that play/pause button 525 was actually depressed. These embodiments may involve a repeated user action to make a user interface control selection. For example, a user would make multiple "clicks" of a user interface control to make the selection. A first "click" can cause media player 500 to determine to audibilize the selected user interface control. For example, "play" may be audibilized when a user presses the play button. This first audio prompt can provide audio guidance as to which button has been depressed, which is helpful to a user when not directing visual attention upon the hand-held device.

A subsequent "click" may then cause media player 500 to perform the action corresponding to the user interface control. For example, pressing the play button a second time may cause a media file to be played. On the other hand, the audio prompt may have informed the user that an unintended selection is about to be made. Therefore, the user can attempt to select a different user interface control. For example, the user may then attempt to press "next" button 520, rather than proceeding to press play button 525 for a second time.

If a determination is made to present an audio prompt for the button press in step 815, the processing follows an intelligent decision path that determines whether an appropriate dialog for the audio prompt is available and how to get the appropriate audio dialog onto an electronic device. The intelligent decision path may include, for example, discovery or identification of types or categories of audio data and whether the audio data is available.

In step 820, a determination is made whether a high quality sources is available. A high quality source may include digital audio files or audio data sampled above a pre-determine or recognized frequency, at a give bit rate, whose size exceeds a pre-determined threshold or limit, or the like, relative to a lower quality source. The determination may be made based on whether a wireless or wired connection to a communications network exists over which the high quality source is accessible. In one implementation, the determination may be made based on selection criteria or user preferences. For example in one mode of operation, a user may desire to hear an audio prompt for every action and menu item selected by the user. In another mode, a user may deactivate audio prompts for the control selections (e.g., the "play" button) and only hear audio prompts for the highlighted menu items. In another mode, audio prompts can be output for only top-level menu items.

If a determination is made that a high quality sources is available, in step 825, the audio prompt is retrieved from the high quality source corresponding to the button press. One example of a high quality source may include lossless or CD-quality pre-recorded audio data or audio files. The pre-recorded audio data or audio files may include professionally made recordings of celebrity voices, cartoon characters, or quotes from television shows or feature films.

If a determination is made in the alternative that a high quality source is not available, in step 830, a determination is made whether a low quality source is available. If a determination is made that a low quality sources is available, in step 835, the audio prompt is retrieved from the low quality source corresponding to the button press. One example of a low quality source may include pre-recorded audio data or audio files compresses using one or more compression or encoding techniques, such as MP3, WMA, OGG, or the like. The pre-recorded audio data or audio files may include generic recordings of human voices or stored audio data or audio files generated using one or more voice or text synthesis techniques.

Referring now to FIG. 8B, if a determination is made in the alternative that a low quality source is not available, in step 840, a determination is made whether text-to-speech (TTS) or voice synthesis is available. If a determination is made that one or more synthesis sources are available, in step 845, the audio prompt is synthesized or generated using voice synthesis or TTS synthesis.

If no source of audio prompts for the audio user interface can be determined and selected, in step 850, one or more beeps or other generic sounds may be output corresponding to the button press. Preferably, in step 855, the audio prompt corresponding to the button press is output that was selectively obtained from a high quality source in step 825, obtained from a low quality source in step 835, or synthesized in step 845. The audio prompts, in some embodiments, can be played according to a selected audio interface mode. When a media player or portable media device is not playing an audio file, only audio files corresponding to the user interface may be played and made audible to the user.

In various embodiments, when a media file is being played back, the audio interface mode can be set to mix the media file and an audio prompt playback in different manners. According to one setting, the volume for playing back a media file may be dynamically reduced when an audio prompt is to be played. For example, the volume for playing back a song or a movie clip can be lowered during the playback of the audio prompt. According to another setting, playback of a media file is paused during the playback of an audio prompt and then restarted after the audio prompt has been played. If a user is making multiple user control selections in a certain time frame, the playback of the media file can be paused for a short period of time so that the playback of the media file need not be paused and restarted multiple times. This can avoid a repeated interruption of a song's playback. For instance, playback of a media file can be paused for five seconds if a user makes at least three user control selections within 5 seconds. The time periods and number of user control selections may vary depending upon a user's preference. Some audio interface modes can designate that the audio prompts be played through a left, right, or both speakers or earphone channels.

Accordingly, a determination may be made whether an appropriate audio dialog is available, such as either on an electronic device or a host/server computer connected to the device, and whether the best available audio dialog can be obtained for output to the user. FIG. 8B ends in step 860.

Figure 9:
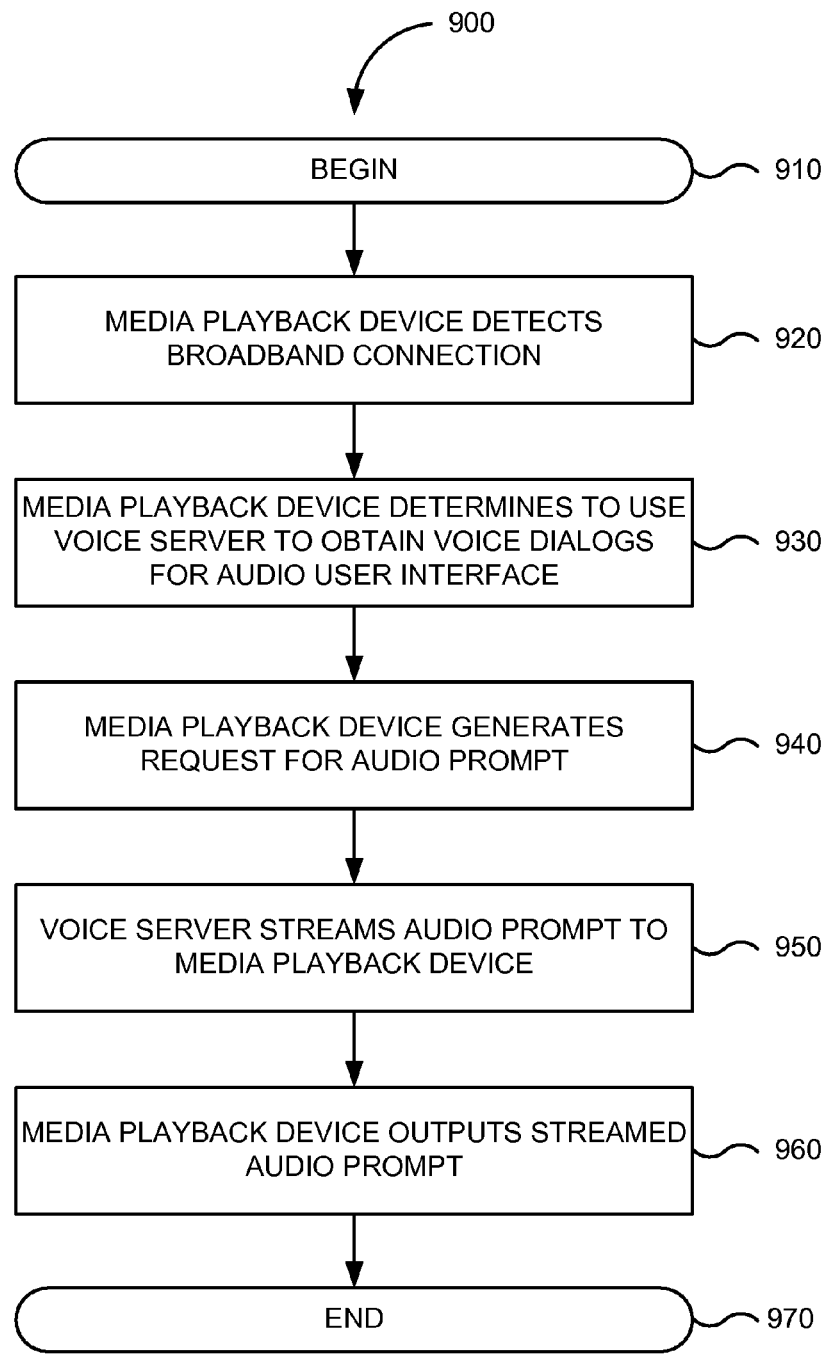
FIG. 9 is a flowchart of a method for streaming audio prompts for an audio user interface in one embodiment according to the present invention.

FIG. 9 is a flowchart of method 900 for streaming audio prompts for an audio user interface in one embodiment according to the present invention. Method 900 generally involves streaming audio prompts to a media playback device based on a connection to a voice server. FIG. 9 begins in step 910.

In step 920, a media playback device (e.g., media player 100) detects a broadband connection. For example, the media playback device may successfully associate with a wireless access point. In yet another example, the media playback device may recognize a wired connection to the Internet.

In step 930, the media playback device determines to use a voice server to obtain voice dialogs for the audio user interface. For example, a software program executed by the media playback device may initiate and complete a handshake with one or more applications hosted by the voice server. In another example, the media playback device may periodically poll the voice server to determine whether a connection is available.

In step 940, the media playback device generates a request for the audio prompt. The request may include information identifying the audio prompt, information identifying a user's interaction corresponding to the requested audio prompt, or the like. The request may include one or more of headers, flags, fields, checks, hashes, or the like. In one embodiment, the request may include hypertext transport protocol (HTTP) data or real-time transport protocol (RTP) data.

In step 950, the voice server streams the audio prompt to the media playback device. In step 960, the media playback device outputs the streamed audio prompt. The voice server may utilize one or more streaming transport protocols (e.g., real-time or faster than real-time) such that the media playback device buffers a portion of the audio prompt before playback.

In various embodiments, the voice server may be accessible on a pay per item or subscription basis. The voice server may support the streaming of uncompressed and compresses (e.g., lossless or lossy) audio data. The voice server may further support the communication of information associated with content or other media assets with which a user may interact (e.g., navigate), such as title information, album information, artist information, genre information, metadata, or the like. FIG. 9 ends in step 970.

Figure 10:
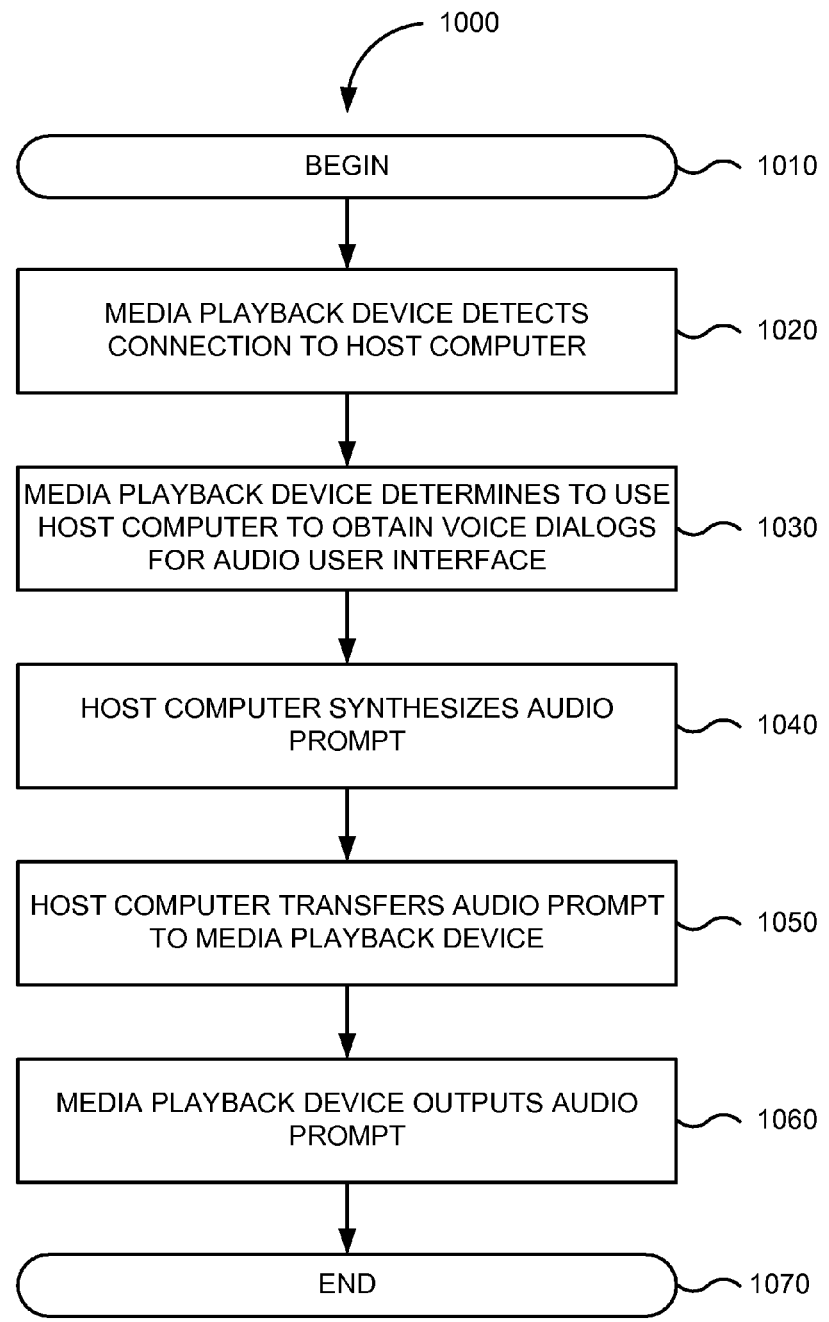
FIG. 10 is a flowchart of a method for creating audio prompts at a host computer system using one or more voice or text to speech synthesis techniques in one embodiment according to the present invention.

FIG. 10 is a flowchart of method 1000 for creating audio prompts at a host computer system using one or more voice or text to speech synthesis techniques in one embodiment according to the present invention. Method 1000 generally involves synthesizing audio prompts for an audio user interface and transferring the synthesized audio prompts to a media playback device. FIG. 10 begins in step 1010.

In step 1020, a media playback device (e.g., media player 100 of FIG. 1) detects a connection to a host computer. For example, the media playback device may detect that the media playback device is coupled to the host computer using a peripheral cable. In another example, the media playback device may detect the proximity of the host computer and establish a wireless connection, for example, using WiFi or Bluetooth modules.

In step 1030, the media playback device determines to use the host computer to obtain voice dialogs for an audio user interface. For example, the media playback device may determine to use the host computer when an internal storage of the media playback device does not have sufficient space for storing audio prompts in addition to content or other media assets. In another example, the media playback device may determine to use the host computer when the media playback device does not include a TTS engine.

In step 1040, the host computer synthesizes an audio prompt. The host computer may use one or more voice synthesis or text-to-speech synthesis techniques to generate the audio prompt. For example, the host computer may determine a profile associated with the media playback device. The profile may include textual descriptions of events registered through button presses, menu selections, or other user interactions, specific to an electronic device. The host computer may audibilize the textual descriptions of the profile by generating and recording a synthesized voice reading. The host computer may generate a single audio prompt for each textual description. The host computer may also generate a single audio prompt that includes audio data for each textual description in addition to information indicative of audio data for a given textual description within the single audio prompt.

In step 1050, the host computer transfers the audio prompt to the media playback device. In one implementation, the host computer generates a plurality of audio prompts of an audio dialog for the audio user interface. The host computer then may transfer the entire audio dialog to the media playback device, for example, when managing content or other media assets on the device. In another example, the host computer may generate and transfer the audio prompt to the media playback device in substantially real-time. In step 1060, the media playback device outputs the audio prompt. FIG. 10 ends in step 1060.

Figure 11:
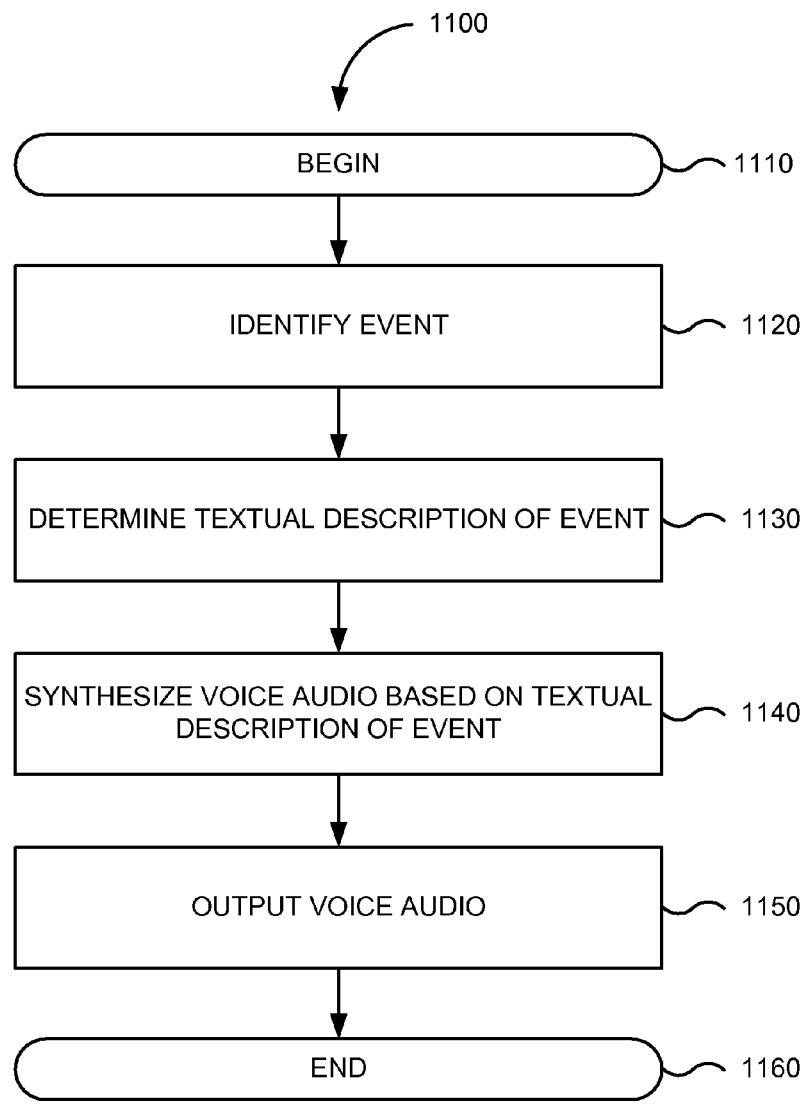
FIG. 11 is a flowchart of a method for creating audio prompts using one or more voice or text to speech synthesis techniques in an alternative embodiment according to the present invention.

FIG. 11 is a flowchart of method 1100 for creating audio prompts using one or more voice or text to speech synthesis techniques in an alternative embodiment according to the present invention. Method 1100 generally involves creating or synthesizing audio data representing textual descriptions of an event. FIG. 11 begins in step 1110.

In step 1120, an event is identified. An event may include any user interface possible with an electronic device. The event may be represented by a button press, a click, a scroll, a touch, a selection, a highlight, or the like by the user. In step 1130, a textual description of the identified event is determined. The textual description may include words, sentences, etc. that describe the event, a device, a user, a portion of content, or the like. The textual description may be generated by a user, a developer, or other third party.

In step 1140, voice audio is synthesized or otherwise generated based on the textual description of the event. In one example, a computer system may retrieve configuration settings for a text-to-speech conversion process. The configuration settings can control various aspect of the voice synthesis or text-to-speech conversion process. For example, the configuration settings can determine the certain text strings to be converted into audio files, quality of the TTS conversions, gender of the voice that verbalizes the text strings, the speed at which an audio prompt is audibilized (e.g., a speaking rate can be increased as the user gets more familiar with the audio prompts), and customizing voices to different subtasks (e.g., the controls and function can be audibilized with one voice while data such as songs and contact names can be audibilized with a different voice). Furthermore, a configuration setting can handle adept manipulation of user interface controls by playing only a part of an audio prompt as a user navigates. For example, while browsing through contact names lexicographically, only the letter (a, b, c . . . ) is rendered until the user reaches the contact name that start with a desired letter. For example, j, as in Jones. Accordingly, it should be understood that the TTS configuration settings can have various settings to correspond to a device, configuration, or user's desires.

Various sound synthesizer rules and engines can be used to generate the audio file. A generalized example of a process for converting a word into an audio file can operate as follows. The process for converting the word "browse" begins by breaking the word into fragments that represent diphone units or syllables, such as "b" "r" "ow" "s". Then various techniques generate audio prompts for each component, which can then be combined to form an intelligible word or phrase. The audio file is typically given an extension that corresponds to the type of audio file created. For example, the audio file for "browse" can be identified by a browse .aiff filename, wherein the .aiff extension indicates an audio file.

In step 1150, the voice audio prompt is output. The voice audio prompt may be output in response to user interactions with a media playback device having an audio user interface. In one embodiment, the audio user interface may include includes pointers to the corresponding audio prompts or audio files. For example, a lookup table may be used for keeping track of correlating pointers to audio prompts. FIG. 11 ends in step 11160.

Figure 12:
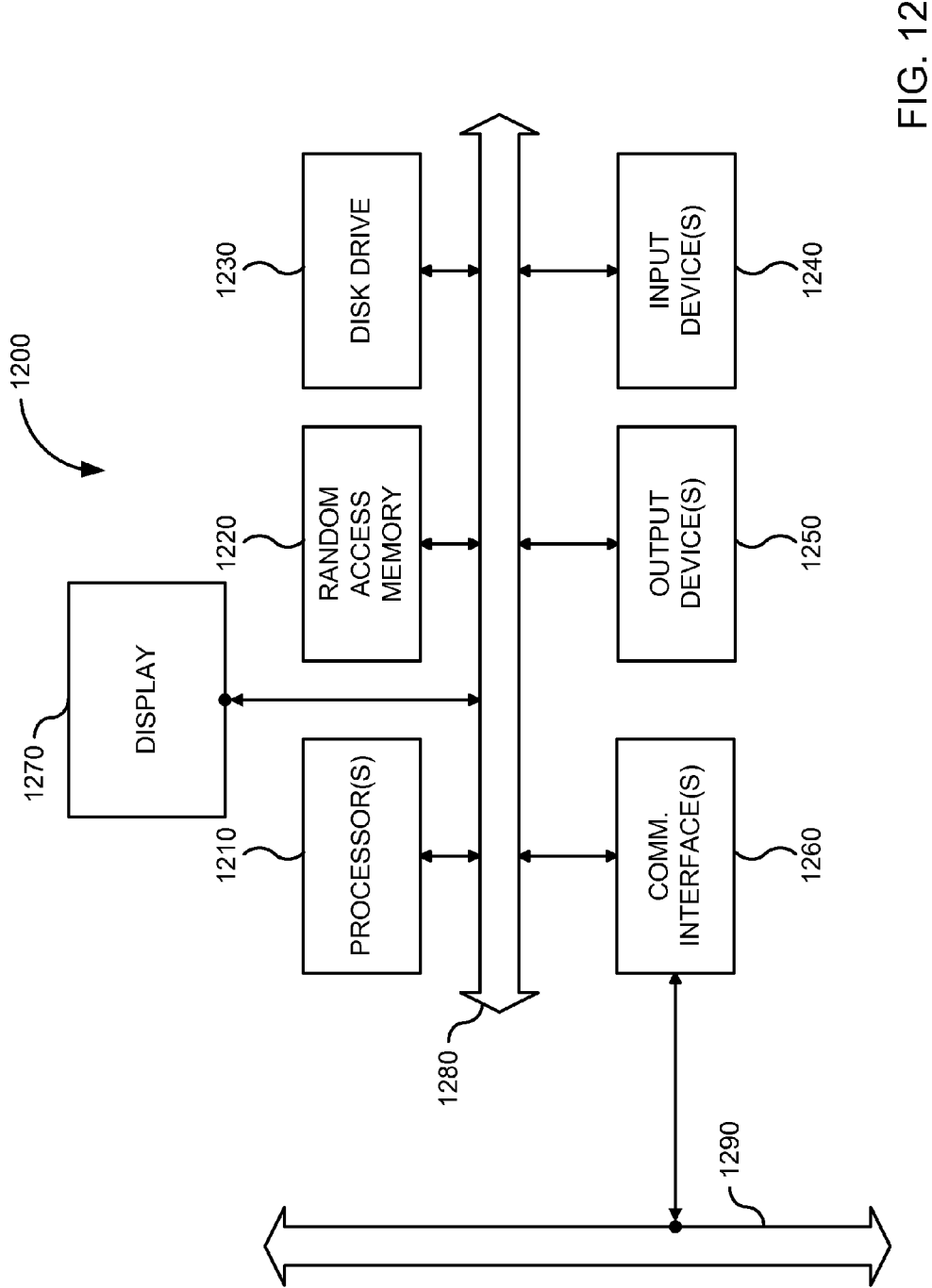
FIG. 12 is a block diagram of an electronic device that may incorporate embodiments of the present invention.

FIG. 12 is a simplified block diagram of a computer system 1200 that may incorporate embodiments of the present invention. FIG. 12 is merely illustrative of an embodiment incorporating the present invention and does not limit the scope of the invention as recited in the claims. One of ordinary skill in the art would recognize other variations, modifications, and alternatives.

In one embodiment, computer system 1200 includes processor(s) 1210, random access memory (RAM) 1220, disk drive 1230, input device(s) 1240, output device(s) 1250, display 1260, communications interface(s) 1270, and a system bus 1280 interconnecting the above components. Other components, such as file systems, storage disks, read only memory (ROM), cache memory, codecs, and the like may be present.

RAM 1220 and disk drive 1230 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 1240 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 1240 may allow a user to select objects, icons, text, and the like, via a command such as a click of a button or the like. In various embodiments, output device 1250 is typically embodied as a display, a printer, a force-feedback mechanism, an audio output, a video component output, and the like. Display 1260 may include a CRT display, an LCD display, a Plasma display, and the like.

Embodiments of communications interface 1270 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 1290, to a FireWire bus, or the like. In other embodiments, these computer interfaces may be physically integrated on the motherboard or system board of computer system 1200, and may be a software program, or the like.

In various embodiments, computer system 1200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 1200 may also include an operating system, such as Microsoft Windows®, Linux®, Mac OS X®, real-time operating systems (RTOSs), open source and proprietary OSs, and the like.

FIG. 12 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smart phone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method performed by a media player for providing an audio user interface to a user of the media player, the method comprising:
    receiving input indicative of an interaction of the user with a user interface associated with the media player;
    determining that an audio prompt is to be outputted;
    determining whether a communication channel to a voice prompt server remote from the media player is available to the media player;
    if the communication channel to the voice prompt server is available, receiving a prepared audio prompt from the voice prompt server;
    if the communication channel to the voice prompt server is not available, synthesizing a new audio prompt; and
    outputting at least a portion of one of the prepared audio prompt or the new audio prompt at the media player.

2. The method of claim 1 wherein synthesizing the new audio prompt includes using a voice synthesis module configured to generate audio using one or more voice synthesis techniques.

3. The method of claim 2 wherein the voice synthesis module is local to the media player.

4. The method of claim 1 wherein the interaction of the user with the user interface associated with the media player comprises a play selection, a next selection, a previous selection, or a stop selection.

5. The method of claim 1 wherein the interaction of the user with the user interface associated with the media player comprises selection of a menu item from a menu displayed on the media player.

6. The method of claim 1 further comprising:
pausing playback of a media file in response to the output of the portion of the prepared audio prompt or the new audio prompt.

7. The method of claim 1 further comprising:
reducing a playback volume of a media file in response to the output of the portion of the prepared audio prompt or the new audio prompt.

8. The method of claim 1 wherein the media player comprises a hand-held or wearable device.

9. A non-transitory computer-readable medium configured to store a set of code modules which when executed by a processor of a media playback device become operational for providing an audio user interface at the media playback device, the computer-readable medium comprising:
code for receiving input indicative of an interaction of the user with a user interface associated with the media playback device;
code for determining that an audio prompt is to be outputted;
code for determining whether a communication channel to a voice prompt server remote from the media playback device is available to the media playback device;
code for, if the communication channel to the voice prompt server is available, receiving a prepared audio prompt from the voice prompt server;
code for, if the communication channel to the voice prompt server is not available, synthesizing a new audio prompt; and
code for outputting at least a portion of one of the prepared audio prompt or the new audio prompt.

10. A portable media playback device comprising:
a media playback system;
a user interface; and
a processor configured to:
receive user input indicative of an interaction of the user with the user interface;
determine that an audio is to be outputted;
determine whether a communication channel to a voice prompt server remote from the media playback device is available to the media playback device;
if the communication channel to the voice prompt server is available, receive a prepared audio prompt from the voice prompt server;
if the communication channel to the voice prompt server is not available, synthesize a new audio prompt; and
initiate playback of at least a portion of one of the prepared audio prompt or the new audio prompt using the media playback system.

11. The portable media playback device of claim 10 wherein the processor is further configured to synthesize the new audio prompt using a voice synthesis module.

12. A media player comprising:
a user interface;
a storage device;
a media playback subsystem;
a voice synthesis module; and
a processor configured to:
receive input indicative of an interaction of a user with the user interface;
determine that an audio prompt is to be outputted;
determine whether a communication channel connection to a voice prompt server remote from the media player is available to the media player;
if the communication channel to the voice prompt server is available, receive a prepared audio prompt from the voice prompt server;
if the communication channel to the voice prompt server is not available, synthesize a new audio prompt; and
instruct the media playback subsystem to output at least a portion of one of the prepared audio prompt or the new audio prompt.

13. The media player of claim 12 wherein the processor is further configured to instruct the voice synthesis module to synthesize the new audio prompt.

14. The method of claim 2, wherein the one or more voice synthesis techniques is a text-to-speech technique.

15. The method of claim 1 wherein the plurality of prepared audio prompts are voice recordings.

16. The method of claim 15, wherein the voice recordings are of higher quality than generated audio prompts.

17. The method of claim 1, further comprising receiving a streaming input from the voice prompt server, the streaming input including the prepared audio prompt.

18. The method of claim 1, further comprising:
receiving a second input indicative of a second interaction of the user with the user interface;
if the communication channel to the voice prompt server is available, receiving a second prepared audio prompt from the voice prompt server;
if the communication channel to the voice prompt server is not available, selecting a non-voice audio prompt from a plurality of non-voice audio prompts stored at the media player; and
outputting at least a portion of one of the second prepared audio prompt or the non-voice audio prompt at the media player.

19. The portable media playback device of claim 11, wherein the processor is further configured to synthesize the new audio prompt using a text-to-speech technique.

20. The portable media playback device of claim 10, wherein the plurality of prepared audio prompts are voice recordings.

21. The portable media playback device of claim 20, wherein the voice recordings are of higher quality than generated audio prompts.

22. The portable media playback device of claim 10, the processor further configured to receive a streaming input from the voice prompt server, the streaming input including the prepared audio prompt.

23. The portable media playback device of claim 10, the processor further configured to:
receive a second input indicative of a second interaction of the user with the user interface;
if the communication channel to the voice prompt server is available, receive a second prepared audio prompt from the voice prompt server;
if the communication channel to the voice prompt server is not available, select a non-voice audio prompt from a plurality of non-voice audio prompts stored at the media player; and
initiate playback of at least a portion of one of the second prepared audio prompt or the non-voice audio prompt using the media playback system.

24. The method of claim 1, wherein determining whether a communication channel to a voice prompt server remote from the media player is available to the media player includes determining whether a broadband communication channel to the voice prompt server exists.

25. The method of claim 1, wherein determining whether a communication channel to a voice prompt server remote from the media player is available to the media player includes determining whether a communication channel to the voice prompt server exists that uses one or more of the set consisting of HTTP, TCP/IP, and RTP/RTSP protocols.

* * * * *